(12) United States Patent
Kaufman

(10) Patent No.: US 9,785,126 B2
(45) Date of Patent: Oct. 10, 2017

(54) INFERRED ENERGY USAGE AND MULTIPLE LEVELS OF ENERGY USAGE

(71) Applicant: ROCKWELL AUTOMATION TECHNOLOGIES, INC., Mayfield Heights, OH (US)

(72) Inventor: Philip John Kaufman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 382 days.

(21) Appl. No.: 14/553,461

(22) Filed: Nov. 25, 2014

(65) Prior Publication Data
US 2016/0147205 A1    May 26, 2016

(51) Int. Cl.
G05B 13/02    (2006.01)
G05B 13/04    (2006.01)

(52) U.S. Cl.
CPC .................. G05B 13/048 (2013.01)

(58) Field of Classification Search
CPC .................................................. G05B 13/048
See application file for complete search history.

(56) References Cited

U.S. PATENT DOCUMENTS

| | | |
|---|---|---|
| 4,300,125 A | 11/1981 | Loshing et al. |
| 4,341,345 A | 7/1982 | Hammer et al. |
| 4,383,298 A | 5/1983 | Huff et al. |
| 4,827,395 A | 5/1989 | Anders et al. |
| 5,202,996 A | 4/1993 | Sugino et al. |
| 5,379,328 A * | 1/1995 | Perez ............... G21C 9/00 376/217 |

(Continued)

FOREIGN PATENT DOCUMENTS

| | | |
|---|---|---|
| EP | 0977137 A2 | 2/2000 |
| EP | 2343791 A2 | 10/2011 |

(Continued)

OTHER PUBLICATIONS

ABB, "Energy Management and Optimization for the Process Industries—Advanced IT Tools for Planning, Monitoring, Controlling, and Reporting Energy System Operations", Aug. 11, 2006 Brochure, published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009, 6 pages.

(Continued)

*Primary Examiner* — Mark Connolly
(74) *Attorney, Agent, or Firm* — Fletcher Yoder P.C.

(57) ABSTRACT

The present disclosure describes system and methods for inferring energy usage at multiple levels of granularity. One embodiment describes an industrial automation system including a first industrial automation component, a first sensor coupled to the first industrial automation component, in which the first sensor measures a first amount of power supplied to the first industrial automation component, a second industrial automation component that couples to the first industrial automation component, and an industrial control system that infers energy usage by the first industrial automation component and the second industrial automation component based at least in part on the first amount of power supplied to the first industrial automation component.

20 Claims, 11 Drawing Sheets

(56) References Cited

U.S. PATENT DOCUMENTS

| | | | |
|---|---|---|---|
| 5,822,207 A | 10/1998 | Hazama et al. |
| 5,924,486 A | 7/1999 | Ehlers et al. |
| 6,012,053 A | 1/2000 | Pant et al. |
| 6,015,783 A | 1/2000 | von der Osten et al. |
| 6,263,255 B1 | 7/2001 | Tan et al. |
| 6,281,784 B1 | 8/2001 | Redgate et al. |
| 6,289,252 B1 | 9/2001 | Wilson et al. |
| 6,321,983 B1 | 11/2001 | Katayanagi et al. |
| 6,633,823 B2 | 10/2003 | Bartone et al. |
| 6,701,298 B1 | 3/2004 | Jutsen |
| 6,732,055 B2 | 5/2004 | Bagepalli et al. |
| 6,747,368 B2 | 6/2004 | Jarrett, Jr. |
| 6,785,592 B1 | 8/2004 | Smith et al. |
| 6,857,020 B1 | 2/2005 | Chaar et al. |
| 6,859,755 B2 | 2/2005 | Eryurek et al. |
| 7,043,316 B2 | 5/2006 | Farchmin et al. |
| 7,274,975 B2 | 9/2007 | Miller |
| 7,277,864 B2 | 10/2007 | Ohnemus et al. |
| 7,409,303 B2 | 8/2008 | Yeo et al. |
| 7,451,019 B2 | 11/2008 | Rodgers |
| 7,477,956 B2 | 1/2009 | Huang et al. |
| 7,531,254 B2 | 5/2009 | Hibbs et al. |
| 7,565,351 B1 | 7/2009 | Callaghan |
| 7,587,251 B2 | 9/2009 | Hopsecger |
| 7,747,416 B2 | 6/2010 | Deininger et al. |
| 7,788,189 B2 | 8/2010 | Budike, Jr. |
| 8,068,938 B2 | 11/2011 | Fujita |
| 8,185,331 B2* | 5/2012 | Parikh | G01W 1/10 290/44 |
| 8,271,363 B2 | 9/2012 | Branscomb |
| 8,970,341 B2* | 3/2015 | Park | B60L 3/12 180/65.21 |
| 9,274,518 B2 | 3/2016 | Pai et al. |
| 9,283,862 B2* | 3/2016 | Bridges | B60L 11/1842 |
| 2002/0013744 A1 | 1/2002 | Tsunenari et al. |
| 2002/0026343 A1 | 2/2002 | Duenke |
| 2002/0066072 A1 | 5/2002 | Crevatin |
| 2002/0099464 A1 | 7/2002 | O'Connor et al. |
| 2002/0099804 A1 | 7/2002 | O'Connor et al. |
| 2002/0116239 A1 | 8/2002 | Reinsma et al. |
| 2002/0169582 A1 | 11/2002 | Eryurek et al. |
| 2002/0178047 A1 | 11/2002 | Or et al. |
| 2002/0198755 A1 | 12/2002 | Birkner et al. |
| 2003/0014500 A1 | 1/2003 | Schleiss et al. |
| 2003/0028527 A1 | 2/2003 | Crosby et al. |
| 2003/0061091 A1 | 3/2003 | Amaratunga et al. |
| 2003/0088370 A1 | 5/2003 | Bagepalli et al. |
| 2003/0110065 A1 | 6/2003 | Twigge-Molecey |
| 2003/0110369 A1 | 6/2003 | Fish et al. |
| 2003/0171851 A1 | 9/2003 | Brickfield et al. |
| 2004/0088119 A1 | 5/2004 | Landgraf |
| 2004/0107345 A1 | 6/2004 | Brandt et al. |
| 2004/0117240 A1 | 6/2004 | Ness et al. |
| 2004/0158506 A1 | 8/2004 | Wille |
| 2004/0199294 A1 | 10/2004 | Fairlie et al. |
| 2004/0204772 A1 | 10/2004 | Maturana et al. |
| 2004/0205412 A1 | 10/2004 | Staron et al. |
| 2004/0249697 A1 | 12/2004 | Ohnemus et al. |
| 2004/0260489 A1 | 12/2004 | Mansingh et al. |
| 2005/0015287 A1 | 1/2005 | Beaver |
| 2005/0034023 A1 | 2/2005 | Maturana et al. |
| 2005/0065971 A1 | 3/2005 | Honda |
| 2005/0143865 A1 | 6/2005 | Gardner |
| 2005/0144154 A1 | 6/2005 | DeMesa et al. |
| 2005/0171910 A1 | 8/2005 | Wu et al. |
| 2005/0198241 A1 | 9/2005 | Pavlik et al. |
| 2005/0198333 A1 | 9/2005 | Dinges et al. |
| 2005/0278296 A1 | 12/2005 | Bostwick |
| 2006/0026145 A1 | 2/2006 | Beringer et al. |
| 2006/0248002 A1 | 11/2006 | Summer et al. |
| 2007/0038646 A1 | 2/2007 | Thota |
| 2007/0073750 A1 | 3/2007 | Chand et al. |
| 2007/0283030 A1 | 12/2007 | Deininger et al. |
| 2008/0015975 A1 | 1/2008 | Ivchenko et al. |
| 2008/0046387 A1 | 2/2008 | Gopal et al. |
| 2008/0046407 A1 | 2/2008 | Shah et al. |
| 2008/0059457 A1 | 3/2008 | Ohnemus et al. |
| 2008/0079560 A1 | 4/2008 | Hall et al. |
| 2008/0127779 A1 | 6/2008 | Morales Cerda et al. |
| 2008/0154749 A1 | 6/2008 | D'hooghe et al. |
| 2008/0255899 A1 | 10/2008 | McConnell et al. |
| 2008/0270272 A1 | 10/2008 | Branscomb |
| 2008/0272934 A1 | 11/2008 | Wang et al. |
| 2008/0319812 A1 | 12/2008 | Sousa et al. |
| 2009/0083843 A1 | 3/2009 | Wilkinson, Jr. et al. |
| 2009/0099887 A1 | 4/2009 | Sklar et al. |
| 2009/0100159 A1 | 4/2009 | Extra |
| 2009/0132176 A1 | 5/2009 | McConnell et al. |
| 2009/0138415 A1 | 5/2009 | Lancaster |
| 2009/0177505 A1 | 7/2009 | Dietrich et al. |
| 2009/0222307 A1 | 9/2009 | Beaver |
| 2009/0281674 A1 | 11/2009 | Taft |
| 2009/0281677 A1 | 11/2009 | Botich et al. |
| 2009/0313164 A1 | 12/2009 | Hoglund |
| 2009/0319315 A1 | 12/2009 | Branscomb |
| 2010/0023360 A1 | 1/2010 | Nadhan |
| 2010/0030601 A1 | 2/2010 | Warther et al. |
| 2010/0042455 A1 | 2/2010 | Liu et al. |
| 2010/0057480 A1 | 3/2010 | Arfin et al. |
| 2010/0088136 A1 | 4/2010 | Cheng et al. |
| 2010/0100405 A1 | 4/2010 | Lepore et al. |
| 2010/0131343 A1 | 5/2010 | Hamilton |
| 2010/0138003 A1 | 6/2010 | August et al. |
| 2010/0217642 A1 | 8/2010 | Crubtree et al. |
| 2010/0217651 A1 | 8/2010 | Crabtree et al. |
| 2010/0218108 A1 | 8/2010 | Crabtree et al. |
| 2010/0249975 A1 | 9/2010 | Rezayat |
| 2010/0262445 A1 | 10/2010 | DeSorbo |
| 2010/0274367 A1 | 10/2010 | Kaufman et al. |
| 2010/0274377 A1 | 10/2010 | Kaufman et al. |
| 2010/0274602 A1 | 10/2010 | Kaufman et al. |
| 2010/0274603 A1 | 10/2010 | Walker et al. |
| 2010/0274611 A1 | 10/2010 | Kaufman et al. |
| 2010/0274612 A1 | 10/2010 | Walker et al. |
| 2010/0274629 A1 | 10/2010 | Walker et al. |
| 2010/0274810 A1 | 10/2010 | Walker et al. |
| 2010/0275147 A1 | 10/2010 | Kaufman et al. |
| 2010/0292856 A1 | 11/2010 | Fujita |
| 2010/0306097 A1 | 12/2010 | Greiner et al. |
| 2010/0314940 A1 | 12/2010 | Palmer et al. |
| 2010/0318233 A1 | 12/2010 | Yunes et al. |
| 2010/0332373 A1 | 12/2010 | Crabtree et al. |
| 2011/0046800 A1 | 2/2011 | Imes et al. |
| 2011/0071721 A1 | 3/2011 | Gilfillan et al. |
| 2011/0172838 A1 | 7/2011 | Pai et al. |
| 2011/0273022 A1 | 11/2011 | Dennis et al. |

FOREIGN PATENT DOCUMENTS

| | | |
|---|---|---|
| WO | WO 2004/074954 A2 | 2/2004 |
| WO | WO 2008/011427 A2 | 1/2008 |

OTHER PUBLICATIONS

ABB, "Energy Management Solution for the Process Industry—Energy Management and Optimization", Apr. 6, 2007 Brochure, published online at [http://libraly.abb.com/global/scot/scot313.nsf/veritydisplay/5e48efb88a7e1cbac125734600737b02/$File/3BFI405000R4001_en_Energy_Management_and_Optimization_3.5.pdf], retrieved Apr. 13, 2009, 12 pages.

A.D. Jayal, F. Badurdeen, O.W. Dillon Jr., I.S. "Jawahir, Sustainable manufacturing: Modeling and optimization challenges at the product, process, and system levels," CIRP Journal of Manufacturing Science and Technology, vol. 2, Issue 3, 2010, pp. 144-152, ISSN 1755-5817.

Dietmair, A., et al., "Energy Consumption Modeling and Optimization for Production Machines", Sustain-able Energy Technologies, 2008, ICSET 2008, IEEE International Conference on IEEE, Piscataway, NJ, USA, Nov. 24, 2008, pp. 574-579, XP031442235, ISBN:978-1-4244-1887-9.

(56) References Cited

OTHER PUBLICATIONS

Dillenburg, Stephen, Timothy Greene, and O. Homer Erekson. "Approaching socially responsible investment with a comprehensive ratings scheme: Total social impact." Journal of Business Ethics 43.3 (2003): 167-177.
EPO: Notice from the European Patent Office dated Oct. 1, 2007 concerning Business Methods, Official Journal of the European Patent Office, vol. 30, No. 11, Nov. 1, 2007, pp. 592-593.
European Search Report for European Patent Application No. 10160581.4-1238 dated Sep. 23, 2010, 8 pages.
European Search Report for European Patent Application No. 10160585.5-1527/2254061 dated Dec. 20, 2010, 9 pages.
European Search Report for European Patent Application No. 10160649.9-1238 dated Sep. 23, 2010, 8 pages.
European Search Report for European Patent Application No. 10160673.9-1238 dated Sep. 23, 2010, 9 pages.
European Search Report for European Patent Application No. 10160737.2-1238 dated Nov. 4, 2010, 9 pages.
European Search Report for European Patent Application No. 10160810 dated Aug. 6, 2010, 2 pages.
European Search Report for European Patent Application No. 10160811.5 dated Sep. 20, 2010, 9 pages.
GE Energy, "Energy and Asset Performance—Fact Sheet", Sep. 2005, General Electric Company, published online at [http://www.gepower.com/prod_serv/serv/industrial_service/en/downloads/gea14163_eap.pdf], retrieved Apr. 13, 2009, 2 pages.
Jawahir, I. S., et al. "Total life-cycle considerations in product design for sustainability: A framework for comprehensive evaluation." Proc. $10^{th}$ Int. Research/Expert Conf. (TMT 2006), Barcelona, Spain, 2006.
Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.
Kiritsis D., et al., "Research Issues on Product Lifecycle Management and Information Tracking Using Smart Embedded Systems", Advanced Engineering Informatics, Elsevier Lnkd—DOI : 10.1016/J. AEI.2004.09.005, vol. 17, No. 3-4, Jul. 1, 2003, pp. 189-202, XP004595481 ISSN: 1474-0346.
Kouloura, et al., "A Systems Approach to Corporate Sustainability in Energy Management of Industrial Units", IEEE Systems Journal, vol. 2, No. 4, Dec. 2008, pp. 442-452.
Seref Erkayhan Ed—Ding Zhen-Hua, et al., "The Use of RFID Enables a Holistic Information Management Within Product Lifcycle Management (PLM)". RFID EURASIA, 2007 $1^{st}$ Annual, IEEE, PI Sep. 1, 2007, pp. 1-4 XP031153342. ISBN: 978-975-01-5660-1.
Yang, et al., "Eco-Design for Product Lifecycle Sustainability", IEEE International Conference on Industrial Informatics, 2006, pp. 548-553.
Y-S Ma, et al., "Product Lifecycle Analysis and Optimization in an Eco-Value Based, Sustainable and Unified Approach", Industrial Informatics, 2006 IEEE International Conference on, IEEE, PI, Aug. 1, 2006, pp. 537-541, XP031003409, ISBN:978-0-7803-9700-2.
European Search Report for Application 14160324.1-1807 mailed on Jun. 18, 2014.
Siemens, Energy Management and Energy Optimization in the Process Industry, Sep. 28, 2011.
PI White Paper: The Proflenergy Profile, Version 1.0 Mar. 2010, 14 pages.

\* cited by examiner

INFERRED ENERGY USAGE AND MULTIPLE LEVELS OF ENERGY USAGE

BACKGROUND

The present disclosure relates generally to energy usage, and more particularly, to determining and managing energy usage in a system or process.

Generally, a control system may be utilized to monitor and control machines or equipment in a process, such as a manufacturing process, or a system, such as an industrial automation system. For example, a control system may be included in a packaging factory to control the various machines in a beverage packaging process. Operating in the process or system, the machines and/or devices may use energy, which presents a cost for operation of the process or system. In other words, the energy usage by each individual machine or device, a group of machines or devices, and the process or system as a whole may be useful for controlling and/or monitoring operation of the system or process.

Accordingly, it would be beneficial to improve the determination of energy usage and the management of energy usage by the machines and/or devices in a system or process.

BRIEF DESCRIPTION

Certain embodiments commensurate in scope with the originally claimed embodiments are summarized below. These embodiments are not intended to limit the scope of the claimed invention, but rather these embodiments are intended only to provide a brief summary of possible forms of the systems and techniques described herein. Indeed, the systems and techniques described herein may encompass a variety of forms that may be similar to or different from the embodiments set forth below.

A first embodiment describes an industrial automation system including a first industrial automation component, a first sensor coupled to the first industrial automation component, in which the first sensor measures a first amount of power supplied to the first industrial automation component, a second industrial automation component that couples to the first industrial automation component, and an industrial control system that infers energy usage by the first industrial automation component and the second industrial automation component based at least in part on the first amount of power supplied to the first industrial automation component.

Another embodiment describes a method that includes receiving, via at least one processor, a first amount of power provided to a first industrial automation component with a first sensor, inferring, via the at least one processor, energy usage associated with the first industrial automation component based at least in part on a model of the first industrial automation component and the first amount of power, and inferring, via the at least one processor, energy usage by a second industrial automation component based at least in part on the first amount of power provided to the first industrial automation component and the energy usage associated with the first industrial automation component, in which the first industrial automation component provides a second amount of power to the second industrial automation component.

Another embodiment describes an industrial automation system that includes a first group of industrial automation components, a sensor coupled to the first group of industrial automation components, in which the sensor measures an operational parameter of the first group of industrial automation components, a second group of industrial automation components related to the first group of industrial automation components, and an industrial control system that determines energy usage by the first group of industrial automation components and the second group of industrial automation components based at least in part on the measured operational parameter of the first group of industrial automation components.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
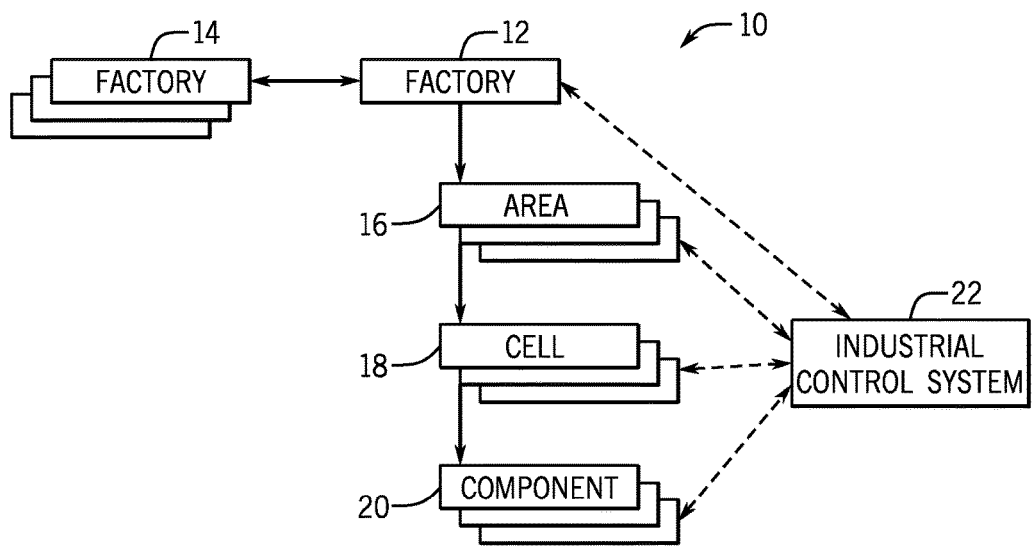
FIG. 1 illustrates a block diagram representing example hierarchical levels of an industrial automation system, in accordance with an embodiment presented herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described above, control systems generally control and monitor operation of machines and/or devices included in a system or process. To simplify the following discussion, the machines and/or devices are generally referred to herein as "components." Accordingly, components in a system or process may include controllers, input/output (I/O) modules, motor control centers, motors, human machine interfaces (HMIs), operator interfaces, contactors, starters, sensors, drives, relays, protection devices, switchgear, compressors, scanners, gauges, valves, flow meters, and the like.

In operation, the components may use energy (e.g., electrical energy). For example, to actuate an electric motor (e.g., a component), electrical energy is supplied to the motor. Since there is generally a cost for procuring energy, the energy usage by the various components may be an operating cost of the system or process. More specifically, the cost may include the financial amount paid to a utility provider and/or the carbon credits used to generate the energy. Thus, to quantify the associated costs of the system or process, the energy usage by each component may be determined. In some embodiments, the energy usage of a component may be determined by using a meter (e.g., power, voltage, or current meter) to measure the power supplied to the component over time. However, placing meters in a system or process may in itself introduce added cost to the operation of the system or process.

Accordingly, one embodiment of the present disclosure describes a method for determining the energy usage of components without directly measuring the energy usage of each component. In other words, as will be described in more detail below, the energy usage of some components may be inferred from the energy usage of other components in the process or system. For example, the energy usage of an electric motor driven by a motor drive may be determined by measuring the power input to the motor drive and subtracting the power used by the internal electronics of the motor drive. In some embodiments, the power used by the internal electronics of the motor drive may be determined with a model based on principles of physics, specification information from the motor manufacturer, and/or previous operation of the motor drive. Additionally, the techniques described herein may enable the energy usage in a process or system to be determined at various levels of granularity, for example, at a component level, a cell level, an area level, a factory level, or a process level.

Based on the energy usage in a system or process, energy usage baselines may be determined. As used herein, an energy usage baseline describes an expected energy usage of a component or a group of components at a particular operational state. For example, based on past energy usage data, it may be determined that a motor drive is expected to use 400+/−55 kWh during the current operational state. Thus, as will be described in more detail below, the energy usage baseline may enable diagnostics and/or prognostics on one or more components in the system or process. For example, one embodiment of the present disclosure describes a method for detecting a potential fault in a component when the energy usage of the component exceeds a set energy usage baseline. In some embodiments, exceeding the energy usage baseline may trigger an alarm or event to notify an operator of the potential fault.

Additionally, since the expected energy usage of the components in a system or process may be determined by a control system, the affects of adjusting operation of the components may be better quantified by the control system. In other words, as will be described in more detail below, various operating plans for the system or process may be evaluated taking into account energy usage costs. More specifically, in some embodiments, an operating strategy (e.g., plan) may be selected based in part on the expected energy usage cost, the value added to a product, and any additional costs associated with the operation plan, such as energy usage allotments (e.g., caps), energy usage premiums, and maintenance costs.

As described above, the techniques described herein may be utilized with a system or a process. Accordingly, by way of introduction, FIG. 1 depicts a block diagram of an industrial automation system 10, which may be any system in the material handling, packaging industries, manufacturing, processing, batch processing, or any technical field that employs the use of one or more industrial automation components. More specifically, the depicted industrial automation system 10 may be divided into various hierarchical levels, such as factories 12, areas 16, cells 18, and components 20. In one embodiment, the industrial automation system 10 may include a factory 12 that may encompass part of the industrial automation system 10. As such, the industrial automation system 10 may include additional factories 14 that may be employed with the factory 12 to perform an industrial automation process or the like.

Each factory 12 or 14 may be divided into a number of areas 16, for example, based on the production processes performed. For example, a first area 16 may include a sub-assembly production process and a second area 16 may include a core production process. In another example, each area 16 may be related to different operations performed in the industrial automation system 10. For instance, in a packaging system, a first area 16 may include a preparation process and a second area 16 may include a packing process. Additionally or alternatively, the areas 16 may be determined based on the physical location of components 20 in the industrial automation system 10 or discipline areas of the industrial automation system 10. For example, the areas may be divided into batch operation areas, continuous operation areas, discrete operation areas, inventory operation areas, and the like.

The areas 16 may further be subdivided into cells 18, which are made up of individual components 20. More specifically, the cells 18 may include a particular group of industrial automation components 20 that perform one aspect of a production process. For example, in the preparation process, a first cell 18 may include the components 20 used for loading, a second cell 18 may include the components 20 used for washing, and a third cell 18 may include the components 20 used for sealing. Additionally, in the packing process, a fourth cell 18 may include components 20 used for sterilization, a fifth cell 18 may include components 20 used for labeling, and a sixth cell 18 may include components used for packing.

To facilitate carrying out the production processes, as described above, the components 20 may include controllers, input/output (I/O) modules, motor control centers, motors, human machine interfaces (HMIs), operator interfaces, contactors, starters, sensors, drives, relays, protection devices, switchgear, compressors, scanners, gauges, valves, flow meters, and the like. Accordingly, the components 20 may function to perform various operations in the industrial automation system 10.

Figure 2:
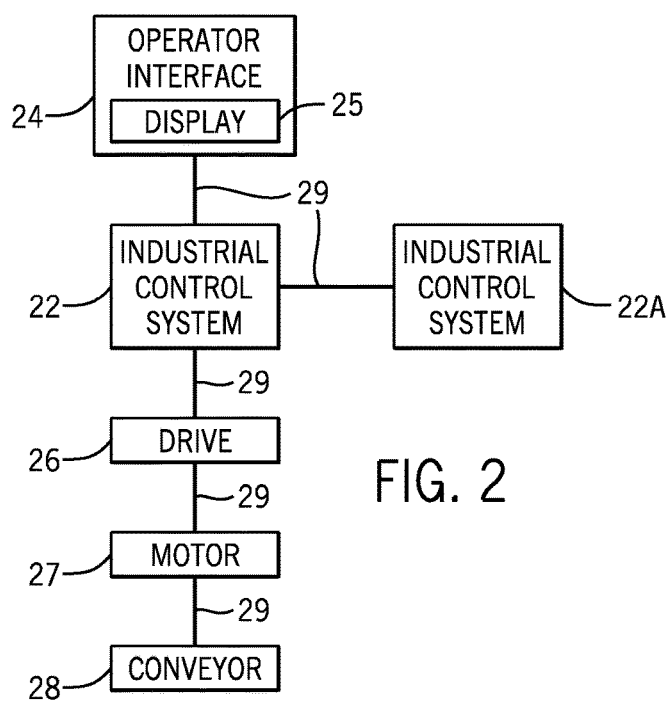
FIG. 2 illustrates a block diagram of an example control system that may be employed within the industrial automation system of FIG. 1, in accordance with an embodiment presented herein.

Additionally, as described above, the industrial control system 22 may monitor and/or control operation of the components 20. As such, the industrial control system 22 may be a computing device that includes communication abilities, processing abilities, and the like. For example, the industrial control system 22 may include one or more controllers, such as a programmable logic controller (PLC), a programmable automation controller (PAC), or any other controller that may monitor or control an industrial automation component 20. Thus, the industrial control system 22 may be communicatively coupled to various components 20, as depicted in FIG. 2. More specifically, as depicted, the industrial control system 22 is communicatively coupled to another industrial control system 22A, an operator interface 24, a drive 26, a motor 27, and a conveyer 28 (e.g., components 20) via a communication network 29. In some embodiments, the communication network 29 may use EtherNet/IP, ControlNet, DeviceNet, or any other industrial communication network protocol.

More specifically, the industrial control system 22 may be communicatively coupled to an operator interface 24, which may be used to modify and/or view settings and operations of the industrial control system 22. The operator interface 24 may be a user interface that includes a display and an input device, which may be used to communicate with the industrial control system 22. In some embodiments, the operator interface 24 may be characterized as a human-machine interface (HMI), a human-interface machine, or the like included on a computing device that interacts with the control system 22, such as a laptop, general purpose computer, a tablet, mobile device, and the like. In other words, as depicted, the operator interface 24 may include a display 25. Additionally, the industrial control system 22 may be communicatively coupled to one or more other industrial control systems 22A. More specifically, the industrial control systems 22 and 22A may communicate information, such as reference points or other details regarding the industrial automation system 10, to enable the industrial control system 22 to become aware of the environment in which the industrial automation system 10 is operating.

The industrial control system 22 may also be communicatively coupled to components 20 that perform specific operations in the industrial automation system. For example, in the depicted embodiment, the industrial control system 22 is coupled to the drive 26, which may convert an input alternating current (AC) voltage into a controllable AC voltage using a rectifier circuit and an inverter circuit to drive a motor 27, which in turn may actuate the conveyer belt 28. Thus, the industrial control system 22 may directly (e.g., drive 26) or indirectly (e.g., motor 27) control operation of the various components in the industrial automation system 10.

With the forgoing in mind, the drive 26, the motor 27, and the conveyor 28 may be considered to be a part of a particular cell 18, area 16, and/or factory 12. Accordingly, in addition to monitoring and controlling operation of individual components 20, the industrial control system 22 may have the ability to monitor and control operation of the various cells 18, areas 16, and factories 14 in the industrial automation system 10. For example, by adjusting the operation of the drive 26 and indirectly the operation of the conveyer 28, the industrial control system 22 may adjust the operation of a packaging process. Thus, as will be described in more detail below, by understanding how each component 20 may be related to the industrial automation system 10 (e.g., with respect to each area 16, each cell 18, and each component 20), the industrial control system 22 may manage operations (e.g., production, energy usage, equipment lifecycle) of the industrial automation system 10.

Figure 3:
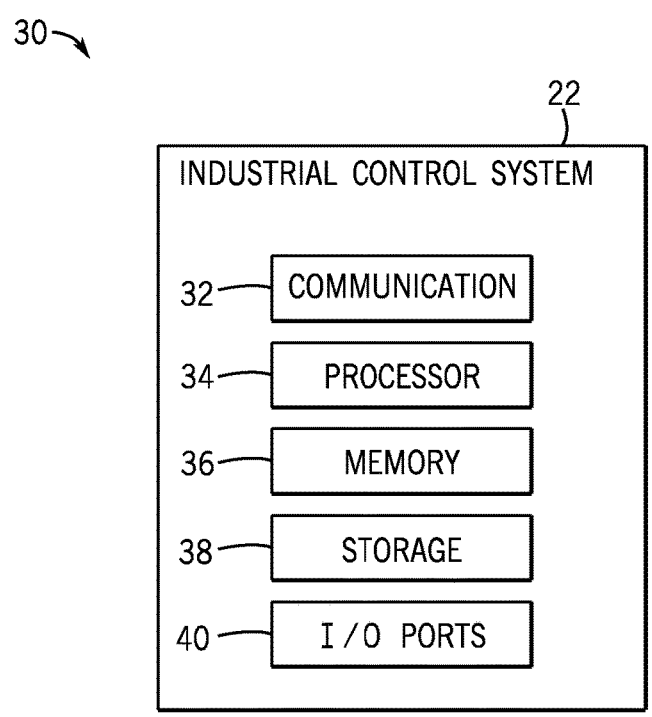
FIG. 3 illustrates a block diagram of components within the industrial control system of the industrial automation system of FIG. 1, in accordance with an embodiment presented herein.

As discussed above, the industrial control system 22 may include a controller or any computing device that includes communication abilities, processing abilities, and the like. One embodiment of the industrial control system 22 is described in FIG. 3. As depicted, the industrial control system 22 includes a communication module 32, a processor 34, memory 36, a storage module 38, and input/output (I/O) ports 40. The processor 34 may be any type of computer processor or microprocessor capable of executing computer-executable instructions. In certain embodiments, the processor 34 may include multiple processors working together.

The memory 36 and the storage module 38 may be any suitable article of manufacture that can serve as media to store processor-executable code, data, instructions, or the like. These articles of manufacture may represent computer-readable media that may store the processor-executable code used by the processor 34 to perform the presently disclosed techniques. The memory 36 and the storage 38 may also be used to store the data, analysis of the data, and the like. The memory 36 and the storage 38 may represent non-transitory computer-readable media (i.e., any suitable form of memory or storage) that may store the processor-executable code used by the processor 34 to perform various techniques described herein. It should be noted that non-transitory merely indicates that the media is tangible and not a signal.

Additionally, the communication module 32 may facilitate communication between the control system 22 and the industrial automation components 20 and/or other industrial control systems 22. As described above, the industrial control system 22 may monitor and control the operation of each respective component 20, cell 18, area 16, or factory 12. Accordingly, the control system 22 and the components 20 may communicate control instructions, status information, and the like via the communication module 32.

Furthermore, to facilitate in the control and monitoring of the components 20, the control system 22 may receive feedback information relating to operational parameters of the industrial control system. As will be described in more detail below, sensors may be placed in and/or around the industrial automation system 10 to measure such operational parameters. In some embodiments, the sensors may include pressure sensors, accelerometers, heat sensors, motion sensors, voltage sensors, and the like. For example, the control system 22 may determine the energy usage of a particular component 20 based on the power measured by a power sensor over time. Accordingly, the operational parameters may be received by the control system 22 from the sensors via the I/O ports 40.

However, as described above, the addition of sensors may add to the operating cost of the industrial automation system 10. Accordingly, as will be described in more detail below, the operational parameters for a first component 20 may enable the control system 22 to infer the operational parameters of a second component 20 related to the first component 20. Thus, to facilitate inferring operational parameters of the second component 20, the control system 22 may determine the relationship between the first component and the second component. In other words, the control system 22 may determine how the industrial automation system 10 is subdivided, how each area 16, cell 18, and component 20 interacts with one another, which components 20 are part of each factory 12, area 16, and cell 18, and the like. By understanding the inter-relationships in the industrial automation system 10, the control system 22 may determine how operational adjustments may directly or indirectly affect the rest of the system. For example, the control system 20 may adjust energy consumption of a first component 20 based on the energy consumption of other components in the industrial automation system 10 to control overall energy usage by the industrial automation system 10. Additionally, as will be described in more detail below, the control system 22 may determine an operational parameters for each component 20 based on criteria such as energy usage, total energy allotment, energy usage premiums, production mix, production levels, and the like.

Figure 4:
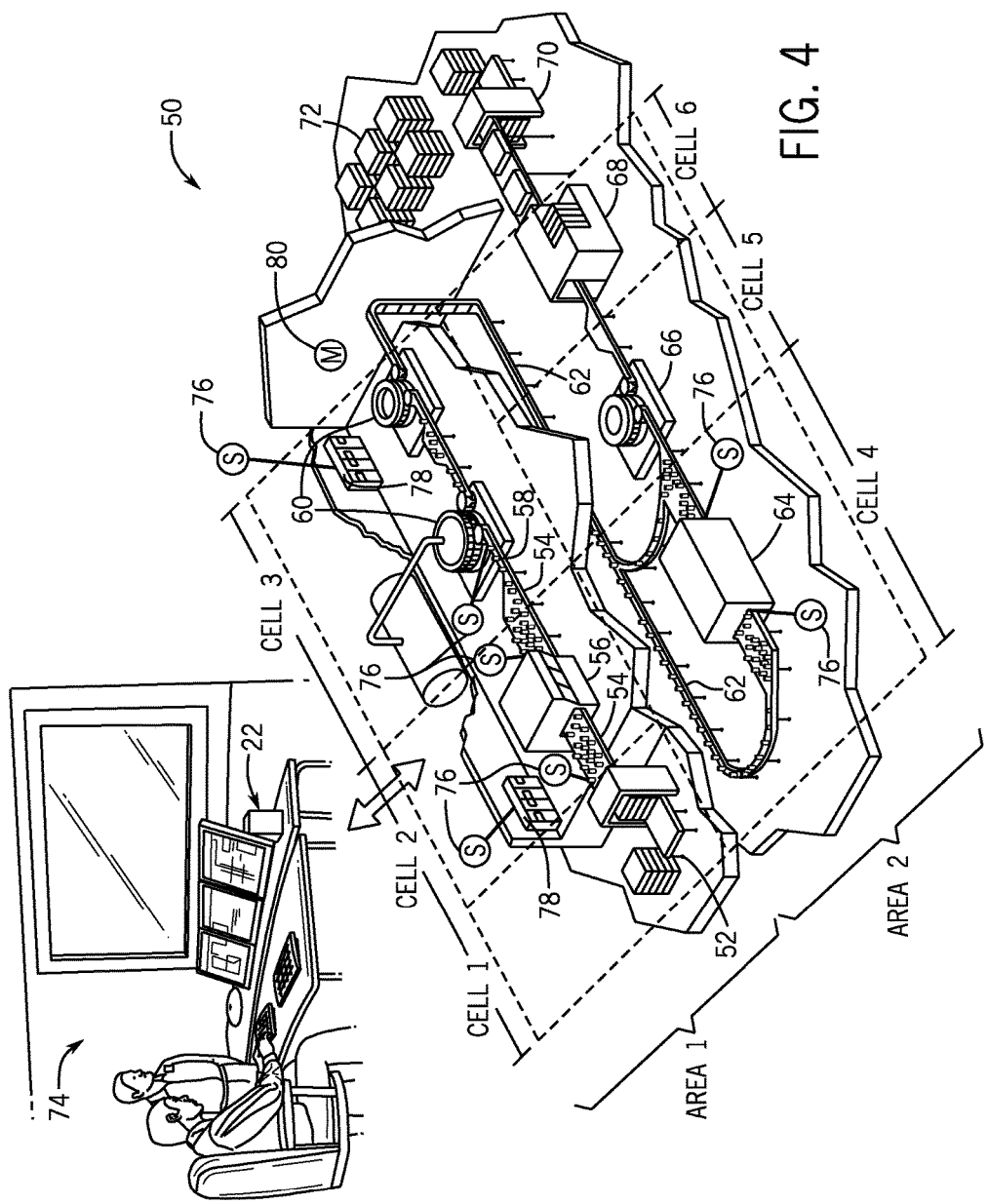
FIG. 4 illustrates an example of the industrial automation system of FIG. 1, in accordance with an embodiment presented herein.

Keeping the foregoing in mind, an example of an industrial automation system 10 (e.g., a packaging factory 50) is described in FIG. 4. More specifically, the packaging factory 50 may be a high-speed packaging line used in the food and beverage industry to process beverage containers. As such, the packaging factory 50 may include industrial automation components 20 (e.g., machine components) that, for example, fill, label, package, or palletize the beverage containers. Additionally, the packaging factory 50 may include automation components 20 (e.g., one or more conveyor sections) that, for example, transport, align, or buffer containers between the machine components. Although FIG. 4 illustrates a packaging factory, it should be noted that the embodiments described herein are not limited for use with a packaging factory. Instead, it should be understood that the embodiments described herein may be employed in any industrial automation environment.

As described above, the packaging factory 50 may subdivided into areas 16, cells 18, and components 20. More specifically, the areas 16 may be categorized based on the production process performed. For example, in the depicted embodiment, the factory 50 may divided into area 1, which corresponds with a preparation process, and area 2, which corresponds with a packaging process. Furthermore, the areas 16 may be further divided into cells 18 based on the function (e.g., aspect) performed in the production process. For example, in the depicted embodiment, area 1 may be divided into cell 1, which corresponds to a loading function, cell 2, which corresponds with a washing function, and cell 3, which corresponds with a filling and sealing function. Additionally, area 2 may be divided into cell 4, which corresponds with a sterilization function, cell 5, which corresponds with a labeling function, and cell 6, which corresponds with a packaging function. Moreover, as described above, to facilitate each particular function, each cell may include one or more industrial automation components 20.

To help illustrate, one embodiment of the operation of the packaging factor 50 is described. For example, the preparation process may begin at cell 1, which as depicted includes loading components 52. More specifically, the loading components 52 feed pallets of empty cans or bottles into the packaging factory 50. From cell 1, the bottles may move on to cell 2, which as depicted includes a conveyer component 54, an industrial automation power component 78, and washing components 56. More specifically, the power component 78 (e.g., a variable speed motor drive) may supply power to a motor to actuate the conveyor component 54, which transports the empty bottles from the loading components 52 to the washing components 56, where the empty cans and bottles are washed and prepared for filling. From cell 2, the washed bottles move on to cell 3, which as depicted includes an aligning conveyor component 58 and filling and sealing components 60. More specifically, as the washed bottles exit the washing components 56, the conveyor component 54 may gradually transition into an aligning conveyor component 58 to feed the bottles to the filling and sealing components 60 in single-file.

From the preparation process, the bottles then move to the packaging process (e.g., area 2). The preparation process may begin at cell 5, which includes a buffering conveyer component 62, an industrial power component 78, and labeling components 60. More specifically, as the sealed bottles exit the filling and sealing components 60, the buffering conveyor component 62 may hold the sealed cans to delay their entry into the next cell. Thus, the power component 78 (e.g., a variable speed motor drive) may supply power to a motor to actuate the buffering conveyor component 62, which may transport the sealed bottles to the labeling components 60, where the bottles are labeled, for example, with a company logo. Additionally or alternatively, the preparation process may begin at cell 4, which includes the buffering conveyer component 62, an industrial power component 78, and sterilization components 64. More specifically, the power component 78 (e.g., a variable speed motor drive) may supply power to a motor to actuate the buffering conveyor component 62, which may transport the sealed bottles to the sterilization components 64, where the bottles are sterilized, for example using ultraviolet light irradiation. In the depicted embodiment, as the bottles exit the sterilization components 64, they may be transported to cell 5 (e.g., labeling components 60). From cell 5, the labeled bottles move to cell 6, which as depicted includes packaging components 68. More specifically, after the cans and bottles have been sterilized and/or labeled, the packaging components 68 may package the bottles into cases (e.g., 6-pack, 24-pack, etc.) before they are palletized for transport at station 70 or stored in a warehouse 72. As can be appreciated, for other applications, the industrial automation components 20 may be different and specially adapted to the application.

Furthermore, as depicted, the packaging factory 50 also includes the industrial control system 22, which may be located in a control room 74 or the like. Additionally, as described above, the control system 22 may receive feedback information (e.g., operational parameters) from various sensors 76 around the packaging factory 50. More specifically, the sensors 76 may measure parameter values of interest relating to the beverage packaging process, such as the speed of a conveyor component 54 or the electric power supplied to a power component 78. Accordingly, as in the depicted embodiment, the sensors 76 may be located in various positions around the packaging factory 50. For example, a motion sensor 76 may be included with the conveyor component 54 to measure the rate at which the bottles are proceeding through the packaging factory 50. Furthermore, sensors 76 may be included in the power components 78 to measure the power supplied to the power component 78. Accordingly, the control system 22 may determine the energy usage of a power component 78 based on the power usage over time. Additionally or alternatively, sensors 76 may measure other operational parameters that enable the control system 22 to determine energy usage by one or more components 20. For example, integrating the current supplied to a pump driving a chemical pump may provide a good first order estimate of the energy used.

Moreover, the factory 50 may include one or more utility meters 80 (e.g., sensors 76). In some embodiments, one utility meter 80 may measure the energy usage by the entire factory 50. Additionally or alternatively, multiple utility meters 80 may be included to monitor the energy usage of a particular area 16 (e.g., area 1 or area 2) or cell 18 (e.g., cells 1-6). For example a first utility meter may measure the utility usage of area 1 and a second utility meter may measure the utility usage of cell 5. Accordingly, the control system 22 may determine the energy usage of a cell 18, an area 16, and/or the factory 50 based on the utility meter measurements.

Energy Usage Inference Engine

As described above, the industrial control system 22 may control operation of the industrial automation system 10 based at least in part on the operational parameters of the system. For example, the control system 22 may instruct the power device 78 to slow down the conveyer section 54 in order to reduce energy usage. Thus, the control system 22 may determine operational parameters for each component 20, each cell 18, each area 16, and each factory 14. More specifically, the operational parameters may include energy usage/consumption, product mixes, product recipes, operating setpoints (e.g., motor speeds, tensions, oven temperature, and conveyor speeds), production run rates, production schedules, product routing, and control algorithms.

In one embodiment, to determine the energy usage of each component 20, a sensor 76 may be placed at every component 20. However, as described above, including sensors in the industrial automation system 10 may increase the operating cost of the system. Thus, in some embodiments, sensors 76 may be included only at selected components, such as the power components 78.

Accordingly, to facilitate controlling operation of the industrial control system, the control system 22 may infer some operational parameters based on measured operational parameters. For example, the control system 22 may infer a rate at which the bottles are entering the washing components 56 (e.g., product throughput) based on a speed of the conveyer component 54, which may be measured by a motion sensor 76. Similarly, the control system 22 may infer the energy usage of a first component based on the power supplied to a second component, which may be measured by a power sensor 76.

Figure 5:
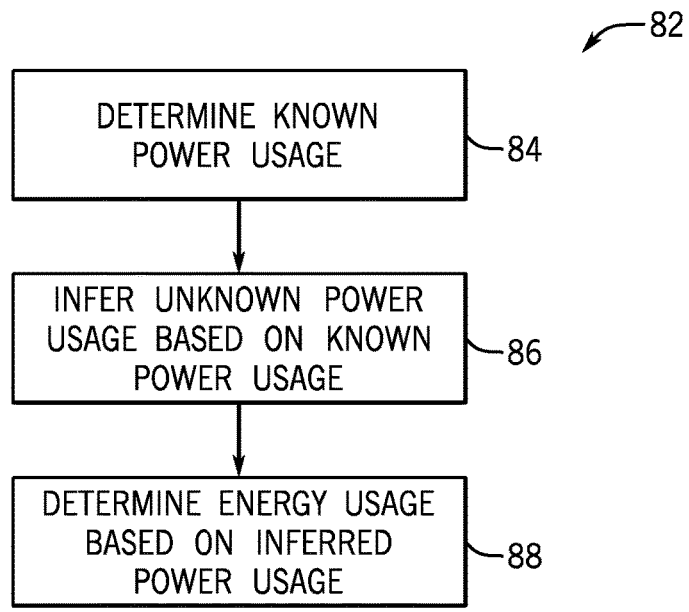
FIG. 5 illustrates a flow diagram of a method for determining energy usage, in accordance with an embodiment presented herein.

One embodiment of a process 82 for determining the energy usage of a component or a group of components is described in FIG. 5. The process 82 may be implemented via machine-readable instructions stored in the tangible non-transitory memory 36 and/or other memories and executed via processor 34 and/or other processors. Generally, the process 82 includes determining a known power usage (process block 84), inferring an unknown power usage based on the known power usage (process block 86), and determining the energy usage based on the inferred power usage (process block 88).

Figure 6:
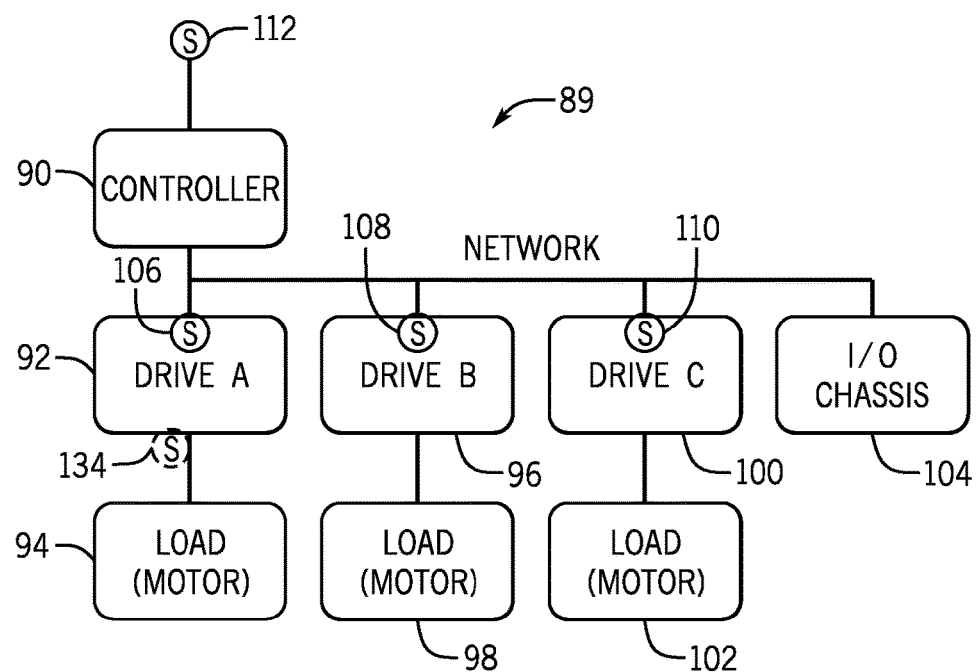
FIG. 6 illustrates a block diagram of a group of components, in accordance with an embodiment presented herein.

To help illustrate, the process will be described in relation to the cell 89 depicted in FIG. 6. The described example is merely illustrative and one or ordinary skill in the art will be able to expand the described techniques to a single component 20, an area 16, a factory 12 or 14, or the entire industrial automation system 10. As depicted, the cell 18 includes a controller 90, a first motor drive 92 that drives a first motor 94, a second motor drive 96 that drives a second motor 98, a third motor drive 100 that drives a third motor 102, and an I/O chassis 104, which enables the cell 89 to communicate with other components 20, the control system 22, a backplane, or a network.

As described above, sensors 76 may be used to determine the power supplied to a component 20 or a group of components 20. For example, in the depicted embodiment, a first sensor 106 is included in the first motor drive 92, a second sensor 108 is included in the second motor drive 96, a third sensor 110 is included in the third motor drive 100, and a fourth sensor 112 is placed before the controller 90. Thus, the first sensor 106 may measure the total power supplied to the first motor drive 92. More specifically, the power supplied to the first motor drive 92 is partially used by first motor drive 92 and partially supplied to first motor 94. Accordingly, the amount of power supplied to the first motor 94 (e.g., used by the first motor 94) may be determined by subtracting the power used by the first motor drive 92 from the total power supplied (e.g., measured by the first sensor 106).

In some embodiments, the power used by the motor drive and the motor may be determined using a model to simulate operation of the motor drive and the motor. For instance, the model of the motor drive may describe the relationship between power usage and operational parameters of the motor drive, such as product being produced, time of day, operators on duty, environmental conditions, materials being used, product mix, operating conditions, production run rates, production schedules, product routing, control algorithms and the like. As will be described in more detail below, the model of the motor drive or motor may be based on principles of physics, specification information from a drive manufacturer, specification information for a motor manufacturer, empirical testing, previous operation of the motor drive or motor, or any combination thereof.

In other words, the power usage of the first motor 94 may be inferred based on the amount of power measured by the first sensor 106 and the amount of power expected to be used by the first motor drive 92. Additionally, the power used by the second motor drive 96, the second motor 98 and the third motor 102 may be determined in a similar manner. Additionally or alternatively, as described above, the sensors may measure other operational parameters that enable the power usage and/or energy usage of any one of the components 20 to be determined.

Furthermore, the fourth sensor 112 may measure a total amount of power supplied to the cell 89 that corresponds to the total amount of power used by the various components 20 in the cell 89. For example, in the depicted embodiment, the total amount of power supplied to the cell 89 is used by the controller 90, the first motor drive 92, the first motor 94, the second motor drive 96, the second motor 98, the third motor drive 100, the third motor 102, and the I/O chassis 104. As described above, the amount of power used by the motor drives and motors may be determined by the sensors 106-110 or using a model of the motor drives and motors. In one example, the power used by the controller 90 and the I/O chassis 104 may be determined by subtracting the power measured by the first sensor 106, the second sensor 108 and the third sensor 110 from the amount of power measured by the fourth sensor 112.

Additionally, the amount of power supplied to the I/O chassis 104 may be determined by subtracting out the amount of power used by the controller 90. In some embodiments, similar to the motor drive, the power used by the controller 90 may be determined using a model to simulate operation of the controller 90. As such, the model of the controller 90 may describe the relationship between power usage and operational parameters of the controller 90. In other words, the power usage of the I/O chassis 104 may be inferred based on the amount of power measured by the sensors 106-112 and the amount of power used by the controller 90.

As mentioned above, energy usage by each motor drive and motor may be inferred using models of the motor drives and motors along with energy consumed by the I/O interface 104, which may be inferred using a model of the controller 90. In other words, more generally, the models that simulate operation of a component 20 may be used to infer energy usage by another component 20. In some embodiments, the use of models to infer energy usage enables the energy usage to be determined in real-time or near real time. More specifically, although there may be some computation involved in using the models, improvements in computing power may enable the calculation of inferred energy usage to be almost instantaneous. In other words, the inferred energy usage by a first component may be viewed at substantially the same time as the measured energy usage by a second component.

To further improve the speed (e.g., real-time nature) of inferring energy usage, the complexity of the model may be adjusted. For example, a simpler (e.g., steady-state) model may be used to improve speed and a more complex model (e.g., a dynamic model) may be used to improve accuracy. More specifically, the complexity of the model may be adjusted by adjusting the operational parameters used, the number of operational parameters used, the order of the model, the type of model, or any combination thereof. In other words, multiple models for a single component 20 may be used and the model that is used may be based on the speed and accuracy desired for a particular function.

Additionally, depending on the component 20 being modeled, the model may be any suitable parametric model that simulates operation of the components, such as a parametric empirical model, a parametric mathematical model, a parametric theoretical model, a parametric first-principles model, a parametric hybrid model, or the like. Furthermore, any suitable modeling techniques may be utilized to generate the model of a component 20.

To help illustrate, non-limiting examples for generating a model of a component 20 are described. Generally, the model may be generated based on known information, for example, from principles of physics, specification information from a manufacturer of the component 20 or a related component 20, previous operation of the component 20, or any combination thereof.

In a first example, the manufacturer specifications for the controller 90 may describe the internal components in the controller 90 and the designed power usage for the internal components. As such, determining which internal components are operating and what operations they are performing under a set of operational parameters (e.g., a particular control action) enables the power usage to be determined. In some embodiments, which internal components are operating and what operations are performing may be determined by looking at the instructions executed by the controller 90 and, more specifically, what they instruct the controller 90 to perform.

In a second example, the manufacturer specifications for the motor drive may include the designed power usage by the motor drive to drive a motor under specific operational parameters (e.g., specific horsepower levels). As such, determining the horsepower level at which the motor is being run enables the power usage by the motor drive to be determined. In some embodiments, the operational parameters may be measured using sensors. For example, a sensor may measure the speed, torque, or horsepower at which the motor is actuating.

As can be appreciated, the manufacturer specifications may not detail the designed power usage for every possible set of operational parameters. In other words, other operational parameters, such as product being produced, time of day, environmental conditions, production schedule, or materials being used, may affect the power usage of the modeled component 20. For example, ambient temperature around the motor and motor drive may cause the motor drive to use a different amount of power than in the specification. Similarly, the duration and frequency (e.g., production schedule) the motor drive is operating may cause the motor drive to use a different amount of power than in the specification.

To help account for the different possible variations in operational parameters, empirical testing may be used. For example, empirical testing may be used to determine how operational parameters may affect power usage by the modeled component. In fact, in some embodiments, empirical testing may by itself enable the determination of the relationship between operational parameters and power usage. For example, a temporary sensor may be placed between the motor drive and the motor to determine the actual amount of power used by each. Additionally, other sensors may measure the operational parameters associated with the motor drive and motor. Based on the measured power usage and the corresponding operational parameters, a model may be generated to describe the empirically determined relationship.

In other words, the empirical testing may use a calibration sequence of measuring the actual power usage of a component 20 and the corresponding operational parameters. More specifically, in some embodiments, the calibration sequence may be performed when the component 20 is commissioned. In such embodiments, the calibration sequence may operate the component 20 with operational parameters that are expected to be experienced and measure the power usage by the component 20, for example, with a temporary sensor. In other embodiments, the calibration sequence may be based on the previous normal operation of the component 20. In such embodiments, the model of the component 20 may be generated based on operational parameters that have actually been experienced by the component 20 and may likely occur again. For example, the energy usage patterns associated with producing a specific product should remain relatively consistent. In other words, the models may be generated based on patterns of operation by the component.

As can be appreciated, in other embodiments, the number and/or types of components 20 included in the cell 89 may differ. For example, the depicted I/O chassis 104 may be replaced with ten I/O chassis. In such an embodiment, the combined power usage of the ten I/O chassis may be determined in the manner described above, for example, by subtracting the power usage by the controller 90 and the power usage measured by the first sensor 106, second sensor 108, and the third sensor 110 from the total power usage measured by the fourth sensor 112. In some embodiments, the power usage of each individual I/O chassis may be determined by dividing the combined power usage equally among the I/O chassis. For example, the power usage of one of the ten I/O chassis may be determined by dividing the combined power usage by ten. However, in other embodiments, if the combined power usage of the plurality of I/O chassis is not significant with respect to the other components (e.g., motor drives, motor, and controller), for example one-tenth of the total power usage, the depicted metering granularity may be sufficient. In other words, it may be sufficient to group together the power usage of a plurality of components (e.g., combined power usage).

Figure 7:
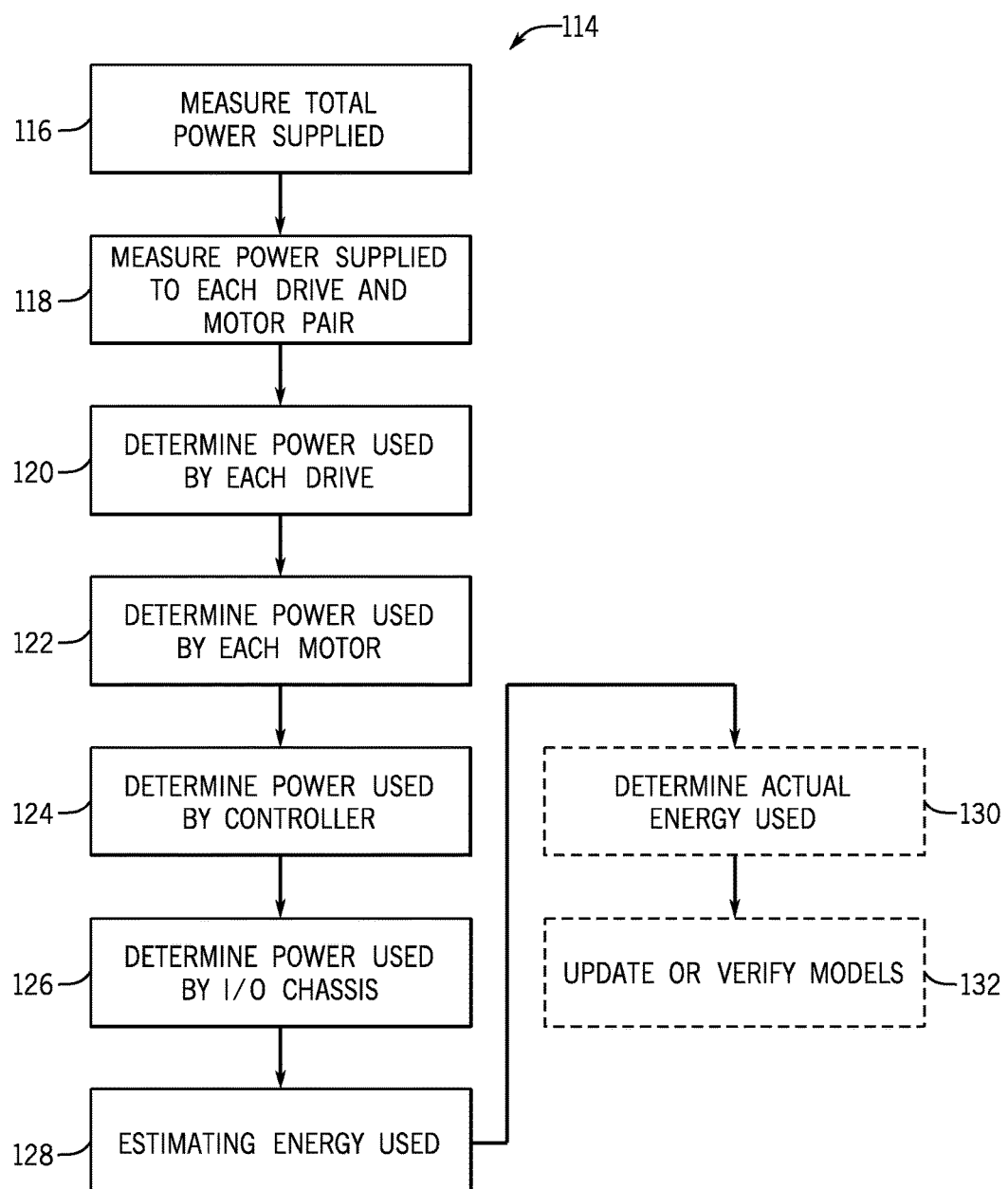
FIG. 7 illustrates a flow diagram of a method for determining energy usage of each component in the group of components of FIG. 6, in accordance with an embodiment presented herein.

Based on the techniques described above, the power usage of all eight components 20 in the cell 89 may be determined (e.g., measured or inferred) through the use of four sensors. Accordingly, the energy usage of the components 20 may be determined based on the power usage over time. One embodiment of a process 114 for determining the energy usage of the components 20 is described in FIG. 7. Generally, the process 114 includes measuring the total power supplied to the cell 89 (process block 116), measuring the power used by each motor drive and motor pair (process block 118), determining the power used by each motor drive (process block 120), determining the power used by each motor (process block 122), determining the power used by the controller (process block 124), determining the power used by the I/O chassis (process block 126), and estimating energy used by each component (process block 128). Additionally, the process 114 may optionally include determining the actual energy used by each component (process block 130) and updating model(s) accordingly (process block 132). Although the process 114 is described with reference to the cell 89 of FIG. 8, it should be noted that the process 14 may be performed with other groups of components. The process 114 may be implemented via machine-readable instructions stored in the tangible non-transitory memory 36 and/or other memories and executed via processor 34 and/or other processors.

Accordingly, in some embodiments, the control system 22 may determine the total amount of power supplied to the cell 89 (process block 116). More specifically, the control system 22 may receive a sensor reading from the fourth sensor 112 via the I/O ports 40, and the processor 34 may determine the supplied power based on the sensor reading. For example, in some embodiments, the sensor reading may be a power measurement. Accordingly, the processor 34 may interpret the sensor reading to determine the power supplied to the cell 89. In other embodiments, the sensor reading may include a current and/or a voltage measurement. Accordingly, in such embodiments, the processor 34 may interpret the sensors readings and calculate the supplied power. For example, the processor 34 may multiply a current measurement and a voltage measurement to calculate the power supplied to the cell 89.

Additionally, the control system 22 may determine the power supplied to each motor drive and motor pair (process block 118). More specifically, the control system 22 may receive sensor readings from the first sensor 106, the second sensor 108, and the third sensor 110 via the I/O ports 40. Based on the sensor readings from the first sensor 106, the control system 22 may determine the power supplied to the first motor drive 92 and first motor 94 pair. Similarly, the processor 34 may determine the power supplied to the second motor drive 96 and second motor 98 pair based on the sensor readings from the second sensor 108, and the control system 22 may determine the power supplied to the third motor drive 100 and the third motor 102 pair based on the sensor readings from the third sensor 110.

As described, the control system 22 may also determine how the power supplied to each motor drive and motor pair is divided. Accordingly, the control system 22 may determine the amount of power used by each motor drive with a model of the motor drive based on principles of physics, manufacturer specifications, empirical testing and/or previous operation of the motor drive (process block 120). In some embodiments, the manufacturer specifications relating to the motor drive may identify the types of internal components included in the motor drive, the expected power usage by each internal component, the expected power usage of the motor drive as a whole, or the like. Additionally, in some embodiments, energy usage may be measured in empirical testing under various sets of operational parameters. Accordingly, a model that simulates the expected power usage by the internal components of the motor drive during particular operations may be created and stored in memory 36.

In some embodiments, the control system 22 may determine the amount of power used by a motor drive by retrieving the model from the memory 36 and inputting the operational parameters of the motor drive into the model. For example, the control system 22 may use the model to determine that the first motor drive 92 uses 200 watts of power to drive the first motor 94 at five horsepower (e.g., operational parameter). As described above, various operational parameters from sensors 76 placed around the industrial automation system 10 may be fed back to the control system 22.

Based on the power used by each motor drive, the control system 22 may determine the amount of power used by each motor (process block 122). More specifically, the control system 22 may determine the power used by a motor by subtracting the power used by a motor drive from the power measured by the sensor in the motor drive. For example, based on sensor readings received from the first sensor 106, the control system 22 may determine that 500 watts of power are supplied to the first motor drive 92 and the first motor 94 when the first motor drive 92 drives the first motor 94 at five horsepower. Continuing with the above example, the control system 22 may determine that the amount of power used by the first motor 94 is 300 watts by subtracting 200 watts (e.g., power used internal electronics of first motor drive 92) from the 500 watts (e.g., power measured by first sensor 106).

Similar to determining the power used by each motor drive, the control system 22 may determine the power used by the controller 90 with a model of the controller 90 based on principles of physics, specification information from the controller manufacturer, and/or previous operation of the controller 90 (process block 124). In some embodiments, the manufacturer specification may provide the general power usage by the controller 90. Accordingly, a model that simulates the expected power usage by the controller 90 during particular operations may be created and stored in memory 36.

Thus, in some embodiments, the control system 22 may determine the amount of power used by the controller 90 by retrieving the controller model from the memory 36 and inputting the operational parameters into the model. Based on the power used by the controller 90, the control system 22 may determine the power used by the I/O chassis 104 (process block 126). More specifically, the control system 22 may determine the power used by the I/O chassis 104 by subtracting the power used by the controller 90, the first motor drive 92, the first motor 94, the second motor drive 96, the second motor 98, the third motor drive 100, and the third motor 102. In other words, the control system 22 may determine the power used by the I/O chassis 104 by subtracting the determined amount of power used by the controller 90, the power measured by the first sensor 106, the power measured by the second sensor 108, and the power measured by the third sensor 110 from the total power measured by the fourth sensor 112. For example, continuing with the above example, if the first, second, and third sensors each measures 500 watts of power and the fourth sensor 112 measures 2000 watts of power, the processor 34 may determine that the amount of power used by the I/O chassis 104 is 200 watts by subtracting 1500 watts (e.g., power used by motor drives and motors) and 300 watts (e.g., power used by the controller) from the 2000 watts (e.g., total supplied power).

Thus, the control system 22 may determine (e.g., measure or infer) the power used by each component 20 in the cell 89. Accordingly, the control system 22 may estimate the energy used by each component 20 based on the power used by each component 20 over time (process block 128). More specifically, the processor 34 may integrate the power used by a particular component 20 over a given time period to determine the energy used by that component 20. Thus, to facilitate the integral calculation, the determined power usage for each component 20 may be stored in memory 36 and/or another storage device, such as a cloud computing system. In some embodiments, the power usage for each component 20 may be continuously determined and stored. Additionally or alternatively, the power usage for each component 20 may be periodically determined and stored (e.g., at discrete intervals).

Optionally, the control system 22 may determine the actual energy used by each component 20 and compare the measured usage with the estimated energy usage (process block 130). The actual energy usage may be determined though any suitable method. For example, as discussed above, additional sensors 76 (e.g., temporary) may be placed around the industrial automation system 10 to measure power usage at a more granular level (e.g., on each individual component 20).

Based on the comparison between the measured usage and the estimated energy usage, the control system 22 may update or verify the models used to infer power usage by the components (process block 132). More specifically, the processor 34 may update the models so that the estimated energy usage will more closely approximate the actual energy usage of the components. Thus, the additional sensors 76 may be placed on specific components 20 that enable the actual energy usage of a modeled component to be measured. For example, referring back to FIG. 6, a fifth sensor 134 may be included between the first motor drive 92 and the first motor 94 to measure the power supplied to the first motor 94 (e.g., power usage of first motor 94). Accordingly, the power used by the first motor drive 92 may be determined by subtracting the power measured by the fifth sensor 134 from the power measured by the first sensor 106, which enables the control system 22 to determine the actual energy used by the first motor drive 92, the first motor 94, or both.

As described above, the inclusion of additional sensors 76 may increase the operating cost of the industrial automation system 10. Accordingly, in some embodiments, the additional sensors may be temporary sensors that are moved to different parts of the industrial automation system 10. For example, the fifth sensor 134 may first be placed between the first motor drive 92 and the first motor 94 to verify or update the model of the first motor drive. Subsequently, the fifth sensor 134 may be place between the second motor drive 96 and the second motor 98 to verify or update the model of the second motor drive, and so on for the other modeled components.

Clearly, the described embodiment of process 114 is not intended to be limiting. Instead, the description of process 114 is intended to be illustrative of techniques that may be utilized to infer the energy usage of components 20 without directly metering each component 20. In other words, the techniques utilized in may be adapted to other cell configurations as well as with different levels of granularity, such as on a component level, an area level, or a factory level. For example, in an alternative embodiment of the cell 89 described, the fourth sensor 112 may instead be placed at the I/O chassis 104. In other words, the total energy usage by the cell 89 is not directly measured. As such, the total energy usage by the cell 89 may be inferred based on the sensor measurements and the model of the controller 90.

Additionally, on a component level, the techniques described may be used to determine the energy usage of different parts that make up a component 20 without directly measuring the power usage of each part. In other words, a control system 22 (e.g., a controller) may control and monitor energy usage by different parts in an individual component 20.

As will be described in more detail below, determining the energy usage at varying levels may enable various diagnostic tools. For example, if it is determined that a particular component 20 is using more energy than expected, the component 20 may be identified as a potentially faulty component. Additionally, understanding the energy usage may enable adjustments in the design and/or operation of one or more components.

In addition to determining the energy usage of individual hardware components, process 82 may be utilized to determine the energy usage for each stage in a production process and/or the production process as a whole. As described above, cells 18 may perform an aspect (e.g., a stage) of the production process. In other words, the techniques described herein may be utilized to determine the energy usage of a group of components 20. To help illustrate, the process 82 will be described in relation to the production process 136 depicted in FIG. 8. More specifically, the production process 136 is the preparation process described above. Accordingly, the production process 136 includes a loading stage 138, a washing stage 140, and a sealing stage 142. As used herein, the loading stage 138 includes the components of cell 1 (e.g., loading components 52), the washing stage 140 includes the components of cell 2 (e.g., conveyer component 54, washing components 56, and power component 78), and the sealing stage 142 includes the components of cell 3 (e.g., sealing components 58).

To facilitate determining the energy usage by the production process 136, a process model may be developed that describes the power usage at each stage. More specifically, similar to an individual component 20, the process model may be developed based on the manufacturer specifications for the components 20 included in production process 136, principles of physics, empirical testing, and/or previous operation of each stage. For example, since the manufacturer specifications may describe the expected power usage by each individual component 20, the expected power usage may be combined into the process model. Additionally, the previous energy usage by each stage along with the state of the stage and the control actions performed may be used to generate the model. In other words, the process model may simulate operation of a process stage to describe the relationship between operational parameters of the process stage and the energy or power usage.

Accordingly, the process model may enable energy usage by a stage to be estimated based on the control actions performed and/or the state of the stage. For example, based on the current state of the production process 136, the process model may determine the amount of energy that will be used to achieve a new setpoint speed or temperature. The developed process model may be stored in the memory 36 and/or another storage device accessible by the control system 22, such as the cloud.

To improve accuracy, the actual power usage may be measured and used to update and/or verify the process model. As described above, sensors 76 may measure the operational parameters of the production process 136, such as the power supplied to a stage. For example, in the depicted embodiment, a first sensor 144 is included in the loading stage 138 and a second sensor 146 is included in the sealing stage 142. Accordingly, the first sensor 144 may measure the power supplied to the loading stage 138 (e.g., power used by the components 20 in the loading stage 138) and the second sensor 146 may measure the power supplied to the sealing stage 142 (e.g., power used by the components 20 in the sealing stage 142). More specifically, in some embodiments, the sensors 144 and 146 may be placed similar to the fourth sensor 112 described above. Additionally or alternatively, as described above, the sensors 144 and 146 may measure other operational parameters that enable the energy usage to be determined.

Figure 8:
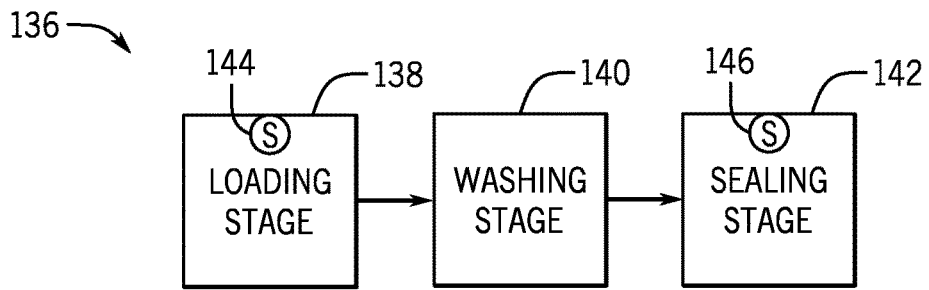
FIG. 8 illustrates a block diagram of a process with multiple stages, in accordance with an embodiment presented herein.

On the other hand, as depicted in FIG. 8, since a sensor is not included in the washing stage 140, to facilitate determining the energy usage, the power supplied to the washing stage 140 may be determined (e.g., inferred) using various techniques described herein. For example, a temporary sensor may be placed in the washing stage 140 to directly measure the power usage and generate a process model for the washing stage 140 that describes the relationship between power usage and operational parameters of the washing stage 140. Additionally or alternatively, an upstream sensor may measure the total power supplied to the production process 136 to generate a process model for the production process 136 as a whole. The process model for the production process 136 may thus describe the relationship between power usage and operation parameters of the production process 136.

Accordingly, the power supplied to the washing stage 140 may be determined by subtracting the power measured by the first sensor 144 and second sensor 146 from the power usage determined using the process model of the production process 136. In other words, the power supplied to the washing stage 140 may be inferred based on the power measured by the sensors 144 and 146 and the process model of the production process 136.

Figure 9:
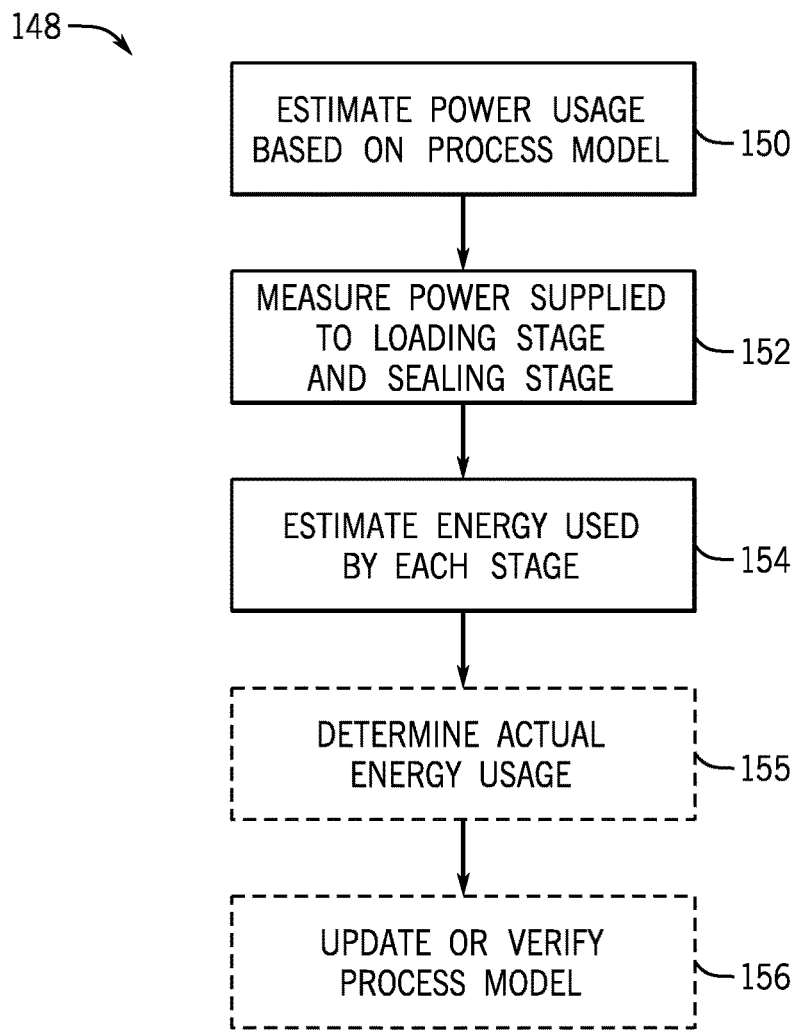
FIG. 9 illustrates a flow diagram of a method for determining energy usage of each stage in the process of FIG. 8, in accordance with an embodiment presented herein.

Based on the techniques described above, the power usage of each of the stages in the production process 136 may be determined (e.g., measured or inferred). Accordingly, the energy usage by each stage and/or energy usage by the production process 136 as a whole may be determined by integrating the power usage over time. One embodiment of a process 148 for determining the energy usage for each stage and the production process 136 as a whole is described in FIG. 9. Generally, the process 148 includes estimating power usage based on a process model (process block 150), measuring the power supplied to the loading stage and the sealing stage (process block 152), and determining the energy usage by each stage (process block 154). Additionally, process 148 optionally includes determining actual energy usage (process block 155) and updating or verifying the process model (process block 156). Although the process 148 is described with reference to the production process 136 of FIG. 8, it should be noted that the process 148 may be performed with other production processes. The process 148 may be implemented via machine-readable instructions stored in the tangible non-transitory memory 36 and/or other memories and executed via processor 34 and/or other processors.

Accordingly, in some embodiments, the control system 22 may estimate the amount of power that will be used based on a process model (process block 150). As described above, the process model may be developed to describe the power usage by the production process 136 as a whole and/or each individual stage in the production process 136. For example, the process model may simulate operation of the production process 136 based on operational parameters of the production process 136. In other words, the process model for the production process 136 may describe the relationship between operational parameters and power usage. Accordingly, the processor 34 may access the process model from memory 36 and determine an estimate of the power that will be used by the production process 136 by inputting one or more operational parameters (e.g., control actions or setpoints) into the process model.

To facilitate determining power usage by the washing station 140, the control system 22 may measure the power supplied to the loading stage 138 and the sealing stage 142 (process block 152). In some embodiments, the control system 22 may receive sensor readings from the first sensor 144, the second sensor 146, and any other sensors included in the production process, such as temporary sensors and/or upstream sensors, via the I/O ports 40. Based on the sensor readings from the first sensor 144, the processor 34 may determine the power supplied to the loading stage 138. Similarly, the processor 34 may determine the power supplied to the sealing stage 142 based on the sensor readings from the second sensor 146.

Based on the power measurements, the processor 34 may determine the power supplied to the washing stage 140 using various techniques. For example, when the process model describes power usage as a whole, the processor 34 may infer the power used by the washing stage 140 by subtracting the power measured by the first sensor 144 and second sensor 146 from the power usage estimated by the process model. Additionally or alternatively, an upstream sensor may be used to measure power usage by the production process 136 as a whole. In other embodiments, a process model may simulate operation of the washing stage 140 and determine power usage by the washing stage 140 based on operational parameters of the washing stage 140.

Based on the power used by each stage, the control system 22 may determine the energy used by the production process 136 based on the power usage over time (process block 154). More specifically, the control system 22 may integrate the power used by each component over a given time period to determine the energy used by that stage. Thus, to facilitate the integral calculation, the determined power usage for each stage may be stored in memory 36 and/or another storage device, such as the cloud. In some embodiments, the power usage for each stage may be continuously determined and stored. Additionally or alternatively, the power usage for each stage may be periodically determined and stored (e.g., at discrete intervals).

Optionally, the control system 22 may determine the actual energy usage by each stage and compare the measured usage with the estimated energy usage (process block 154). The actual energy usage may be determined though any suitable method. For example, as discussed above, additional sensors 76 (e.g., temporary) may be placed around the industrial automation system 10 to measure power usage at a more granular level (e.g., on the washing stage 140 or upstream from the production process 136). For example, when the additional sensor is placed upstream from the production process 136, the actual power usage by the production process 136 and the washing station 140 may be measured. Thus, the actual energy usage may be determined by integrating the actual power usage over time.

Based on the comparison, the control system 22 may update or verify the process model used to infer power usage (process block 156). In some embodiments, the processor 34 may update the process model so that the estimated energy usage will more closely approximate the actual energy usage of each stage or the production process 136 as a whole. Additionally or alternatively, the processor 34 may update or verify the process model based on a comparison of the estimated energy usage and the actual energy usage for each stage.

In further embodiments, the control system 22 may update or verify the process model by comparing actual (e.g., measured) power usage with the power usage estimated by the process model. In some embodiments, the control system 22 may update the process model so that the estimated power usage will more closely approximate the actual power usage of each stage or the production process 136 as a whole. Additionally or alternatively, the processor 34 may update or verify the process model based on a comparison of the estimated power usage and the actual power usage for each stage.

As illustrated in the above examples, sensors 76 are strategically placed such that the energy usage by each component 20 or group of components (e.g., a cell 18, an area 16, a factory, a stage, or a production process) may be determined (e.g., measured or inferred). In some embodiments, to facilitate the placement of the sensors 76, the control system 22 may analyze the automation system or production process to recommend where to place sensors 76 and/or what sensors 76 to use.

To help illustrate, a non-limiting example is described. More specifically, the control system 22 may first determine what sensors 76 are currently in place (e.g., location and/or type). In some embodiments, this may include polling each component 20. In other embodiments, an operator may manually input the information. Based on the sensor information, the control system 22 may recommend additional sensors 76 to include to achieve the desired level of energy usage granularity. For example, referring again to the cell 89 described in FIG. 6, the control system 22 may recommend the placement of a power sensor (e.g., type) upstream from the controller 90 (e.g., location) so that energy usage for each of the downstream components 20 may be determined.

Additionally, as illustrated in the above examples, the energy usage in a component 20 or a group of components (e.g., a cell 18, an area 16, a factory, a stage, or a production process) may be determined. Moreover, the energy usage may be determined on various levels of granularity (e.g., component level, cell level, stage level, area level, or factory level). As will be described in more detail below, determining the energy usage of the production process 136 and each stage may enable diagnostics. For example, if it is determined that a particular stage is using more energy than expected, the components 20 in the stage may be identified as potentially faulty and requiring maintenance. Additionally, understanding the energy usage may enable adjustments in the design and/or operation of one or more components.

Clearly, the described embodiment of process 148 is not intended to be limiting. Instead, the description of process 148 is merely intended to be illustrative of techniques that may be utilized to determine (e.g., infer) the energy usage of a production process and each stage in the production process without directly metering each stage. In other words, the techniques utilized in may be adapted to other production processes.

The techniques described herein may be expanded beyond energy usage to further quantify energy in the industrial automation system 10. For example, in each of the embodiments described above, the energy used by the components 20 (e.g., a stage) is described as being determined. However, in real-world situations, energy losses may cause the amount of energy consumed to be different from the amount of energy used. More specifically, energy losses may result from conductive or radiative losses, windage losses, frictional losses, and the like (e.g., waste). In other words, as used herein, "energy consumed" in intended to describe the total amount of energy supplied and "energy usage" is intended to describe the total of amount of energy that is used by the components 20 to perform a control action or achieve a setpoint. Thus, the amount of energy consumed may be more than the amount of energy actually used by the components 20. Accordingly, each of the techniques described herein may be adapted to further take into account the amount of energy consumed versus the amount of energy actually used.

Figure 10:
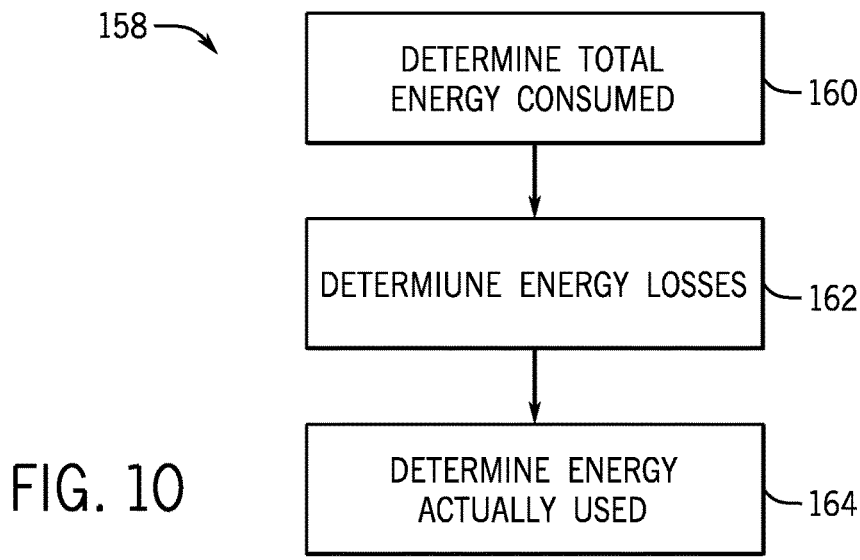
FIG. 10 illustrates a flow diagram of a method for determining actual energy used by a component or a group of components, in accordance with an embodiment presented herein.

One embodiment of a process 158 for determining the amount of energy used is described in FIG. 10. Generally the process 158 includes determining energy consumed (process block 160), determining the energy losses (process block 162), and determining the actual energy used (process block 164). The process 158 may be implemented via machine-readable instructions stored in the tangible non-transitory memory 36 and/or other memories and executed via processor 34 and/or other processors.

As described above, the process 158 may be utilized to account for the amount of energy consumed versus the amount of energy actually used. To help illustrate, the process 158 will be described in relation to the cell 89 above. As can be appreciated, energy losses in cell 89 may generally result from various causes, such as resistance in the cabling (e.g., wires) that carries electricity between the components 20. For example, an energy loss may result in the connection between the first motor drive 92 and the first motor 94. Similarly, an energy loss may result in the connection between the controller 90 and each of the first motor drive 92, the second motor drive 96, the third motor drive 100, and the I/O chassis 104. Additionally, an energy loss may result from friction in the motors and losses in the windings of the motors.

To help account for the various energy losses, energy loss models may be developed based on principles of physics, manufacturer specifications, and/or previous operations. For example, the manufacturer specification may describe the amount of energy loss in one foot of cabling between the first motor drive 92 and the first motor 94. Additionally or alternatively, the energy loss may be calculated based on the materials, circumference, cross-sectional area, and/or other characteristics of the cabling. Furthermore, in some embodiments, temporary sensors 76 may be put in place before and after the cabling to directly measure energy loss in the cabling. Other energy loss models may similarly be developed to model other losses in the cell 89. The models may be stored in memory 36 and/or other storage devices accessible by the control system 22.

Although the energy loss models are described as separate models, they may additionally or alternatively be included in the various models of the components 20. For example, the energy loss model describing energy loss between the first motor drive 92 and the first motor 94 may be included in the model of the first motor drive described above.

Accordingly, in some embodiments, the control system 22 may determine the total amount of energy consumed by the cell 89 (process block 160). In other words, the control system 22 may determine the total amount of energy supplied to the cell 89. More specifically, in some embodiments, the control system 22 may receive a sensor reading from the fourth sensor 112 via the I/O ports 40 and the control system 22 may determine the supplied power based on the sensor reading. Accordingly, the control system 22 may estimate the energy consumed by the cell 89 by integrating the power measured by the fourth sensor 112 over a given time period.

Additionally, the control system 22 may determine the energy losses in the cell 89 (process block 162). As described above, the energy losses in the cell 89 may be determined based on principles of physics, manufacturer specifications, and/or previous operation. For example, an energy loss model may be developed to describe the amount of energy loss expected to result from the cabling that carries electricity from the first motor drive 92 to the first motor 94. More specifically, the energy loss models may describe the energy loss based on operational parameters. For example the energy loss model for the cabling between the first motor drive 92 and the first motor 94 may describe the energy loss based on the type of cabling, the material used in the cabling, the circumference of the cabling, the cross-sectional area of the cabling, temperature of the cabling, placement of the cabling (e.g., bends or relationship to other components), and the like.

Accordingly, the control system 22 may determine the energy loss in the cell 89 by accessing an energy loss model from memory 36 and inputting the relevant operational parameters to the model. Thus, the control system 22 may determine the energy actually used by the cell 89 by subtracting the energy losses from the total energy consumed (process block 162).

By separating out the amount of energy actually used, the configuration and/or operation of the cell 89 may be adjusted, for example, to minimize waste (e.g., energy losses). For example, the length of cabling between the first motor drive 92 and the first motor 94 may be shortened to reduce energy loss. Additionally or alternatively, the cabling used between the first motor drive 92 and the first motor 94 may be changed out if an alternative produces better results (e.g., cheaper cost without substantial increase in energy loss or substantially reduction in energy loss). In other words, as will be described in more detail below, quantifying the amount of energy loss may provide further insight into design and operation considerations.

Clearly, process 158 may be adapted for use in a single component 20 or other groups of components (e.g., a cell 18, an area 16, a factory 12, or a production process). For example, energy loss models may be developed to describe energy losses in the loading components 138, the washing components 140, and the sealing components 142 of the production process 136 described above. Similar to the example described above, the energy loss models may be developed based on principles of physics, manufacturer specifications, and/or previous operations.

In addition to quantifying the energy usage (or consumption), energy in the industrial automation system 10 may be further quantified in relation to a product as it proceeds through a production process. More specifically, an energy balance model may be developed that describes energy in the input product, energy losses, energy used by the production process, energy in the output product, and any other energy in the production process. In other words, the energy balance model may provide an aggregate measure of energy in the production process.

Figure 11:
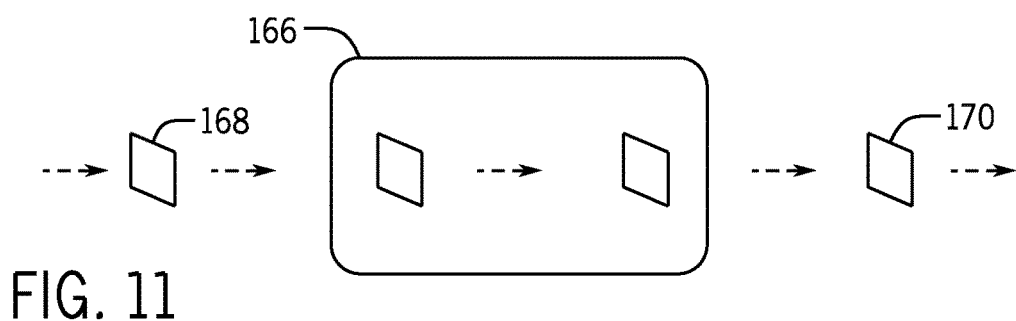
FIG. 11 illustrates a block diagram of a product in a production process, in accordance with an embodiment presented herein.

To help illustrate, a production process 166 is described in FIG. 11. As depicted, an input product 168 is input to and processed by the production process 166. After processing, an output product 170 is output from the production process 166. More specifically, the energy in the production process 166 may include the energy included with the input product 168, the energy consumed by the production process 166, and the energy output with the output product 170. For example, in a baking production process, the input product 168 may have a certain amount of heat (e.g., energy), the baking process 166 may use electricity (e.g., energy) to bake the product, the output product 170 may have a certain amount of residual heat (e.g., energy), and energy losses may consume energy.

As described above, the energy balance model may provide an aggregate measure of such energy. In other words, the control system 22 may use the energy balance model to determine the energy present in the production process 166. More specifically, the energy balance model may output the energy present in the production process 166 when operating according to one or more operational parameters. For example, the control system 22 may input a desired production schedule to determine the aggregate energy present if the desired production schedule is followed. Similarly, the control system 22 may input a desired output product 170 quality to determine the aggregate energy present to achieve the desired quality. As will be described in more detail below, the aggregate measure of energy may enable adjustments to the configuration and/or operation of the production process.

Figure 12:
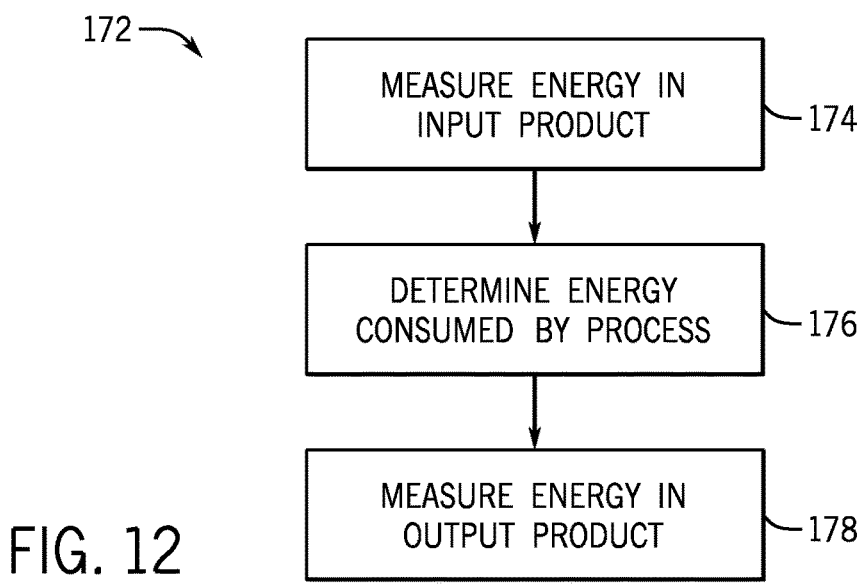
FIG. 12 illustrates a flow diagram of a method for tracking energy usage in the production process of FIG. 10, in accordance with an embodiment presented herein.

Accordingly, to generate the energy balance model, the energy in a production process may be tracked in relation to the operational parameters of the production process. To help illustrate, one embodiment of a process 172 for tracking the energy in the production process 166 is described in FIG. 12. Generally, the process 172 includes measuring the energy in the input product (process block 174), determining the energy consumed by the production process (process block 176), and measuring the energy in the output product (process block 178). The process 172 may be implemented via machine-readable instructions stored in the tangible non-transitory memory 36 and/or other memories and executed via processor 34 and/or other processors.

In one embodiment, the control system 22 may determine the energy included with the input product 168 (process block 174). More specifically, the control system 22 may determine the energy based on readings from sensors. For example, the control system 22 may determine the heat (e.g., energy) included with the input product 168 based on a readings from a sensor that measures the temperature of the input product 168. Additionally or alternatively, sensors may be used to measure other type of energy included with the input product 168, such as electrical energy, chemical energy, or mechanical energy.

The control system 22 may also determine the energy consumed by the production process 166 (process block 176). In some embodiments, an upstream sensor may be in place to measure the energy consumed by the production process 166. In other embodiments, the techniques described herein may enable the consumed energy to be determined without the use of an upstream sensor. For example, a process model may be used to determine energy used by the production process 166 and energy loss models may be used to determine the energy losses in the production process 166. Thus, by combining the energy used and the energy losses, the control system 22 may determine the energy consumed by the production process 166.

Similar to determining the energy input with the input product 168, the control system 22 may determine the energy output with the output product 170 (process block 178). More specifically, the control system 22 may determine the energy based on readings from sensors. For example, the control system 22 may determine the heat (e.g., energy) included with the output product 170 based on a readings from a sensor that measures the temperature of the output product 170. Additionally or alternatively, sensors may be used to measure other type of energy included with the output product 170, such as electrical energy, chemical energy, or mechanical energy.

As described above, the energy balance model may describe the aggregate energy in the production process 166 for various operational parameters. As such, the control system 22 may generate energy balance model by repeating process 172 for different operational parameters (e.g., operating strategies). In other words, the control system 22 may track the energy in the production process 166 under different operational parameters. More specifically, in some embodiments, the control system 22 may track the energy during normal operation of the production process 166. As such, the control system 22 may track the energy for realistic operational parameters that may occur again (e.g., a pattern). Additionally or alternatively, the control system 22 may run a setup sequence that executes the production process 166 with various operational parameters.

Based on the techniques described above, energy usage for one or more components may be inferred from energy usage by other components. As such, technical effects include enabling the energy information to be determined on various levels of granularity, such as a component level, a cell level, an area level, a factory level, or a production process level. More specifically, in some embodiments, the number of sensors used may be reduced by inferring the energy usage of components. For example, the energy usage of a component may be inferred by modeling the component and determining energy usage based on the model and energy usage by related components. As such, utilizing the inference engine described above may enable the use of fewer sensors, which results in less maintenance.

Energy Usage Auto-Baseline

Based on the techniques described above, energy in an industrial automation system 10 may be quantified on multiple levels and through various metrics (e.g., energy usage, energy consumption, process model, and energy balance model). For example, the control system 22 may determine the energy usage of one or more components. As described above, such energy metrics may facilitate diagnostics and/or prognostics on the industrial control system. More specifically, as will be described in more detail below, the energy usage over time may facilitate identifying when a component 20 is potentially faulty and/or predicting when a maintenance related activity should occur.

In some embodiments, the energy usage over time may be used to generate an energy usage baseline. As used herein, the "energy usage baseline" is intended to describe an expected energy usage range (e.g., threshold or energy usage profile). Accordingly, for example, when the energy usage by a component 20 falls outside a range/tolerance of the energy usage baseline, the component 20 may be identified as potentially faulty.

Figure 13:
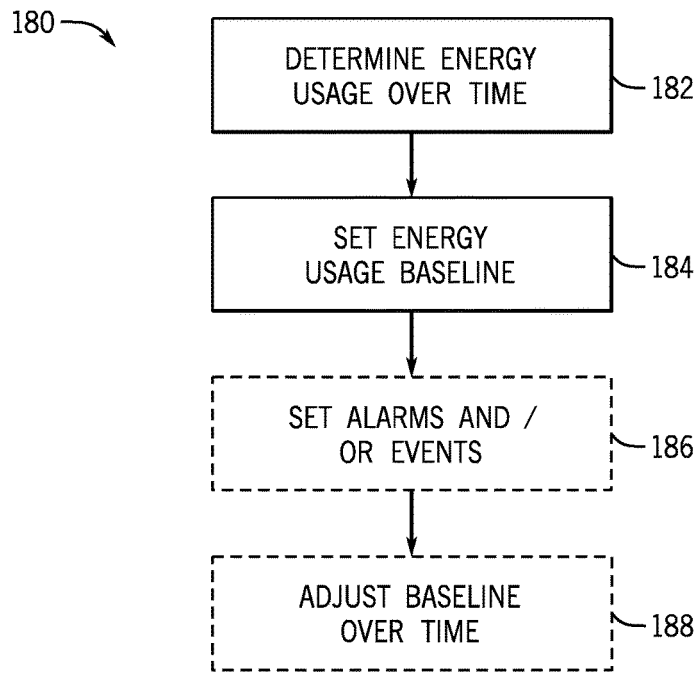
FIG. 13 illustrates a flow diagram of a method for setting an energy usage baseline for a component or a group of components, in accordance with an embodiment presented herein.

One embodiment of a process 180 for setting an energy usage baseline is described in FIG. 13. Generally, the process 180 includes determining energy usage over time (process block 182) and setting the usage baseline (process block 184). Optionally, process 180 also includes setting an alarm and/or an event (process block 186) and adjusting the energy usage baseline over time (process block 188). As will be described in more detail below, an energy usage baseline may be set for various levels of granularity, such as internal components, components 20, cells 18, areas 16, factories, or production processes. The process 180 may be implemented via machine-readable instructions stored in the tangible non-transitory memory 36 and/or other memories and executed via processor 34 and/or other processors.

Accordingly, in some embodiments, the control system 22 may determine the energy usage of one or more components 20 over time (process block 182). As discussed above, the control system 22 may determine energy usage through various techniques, such as directly measuring energy usage or inferring energy usage. To facilitate determining the energy usage over time, the control system 22 may store the determined energy usage in memory 36 and/or other storage devices, such as the cloud. More specifically, in some embodiments, energy usage may be divided into sets based on time, state of a component, and/or control actions performed. For example, the energy usage may be divided into the energy usage during each five minute interval of operation. Additionally or alternatively, the energy usage may be divided into energy usage to wash ten bottles. As will be described in more detail below, this may enable the energy usage baseline to more accurately define a range of expected energy usage.

Based on the energy usage over time, the control system 22 may set an energy usage baseline for the one or more components (process block 184). As described above, the energy usage baseline may include a range of energy usage that is expected for the one or more components. For example, the energy usage baseline for a motor drive (e.g., first motor drive 92) may be 400+/−55 kWh. Accordingly, to determine the energy usage baseline, the processor 34 may retrieve the stored energy usage over a period of time from memory 36 and determine an average of the values. For example, the control system 22 may determine an average of the ten most recently stored energy usage values for the motor drive and determine that the average energy usage by the motor drive is 400 kWh. Additionally, the control system 22 may determine a standard deviation of the stored energy usage values to determine a range of expected energy usage around the mean. For example, the control system 22 may take the standard deviation of the ten most recently stored energy values for the motor drive and determine that the corresponding standard deviation is 55 kWh. The energy usage baseline may be stored in memory 36, storage 38, or other storage device, such as a cloud storage device. As will be described in more detail below, since the energy usage baseline describes the expected energy usage, the energy usage baseline may be facilitate diagnostics and/or prognostics on the one or more components.

In some embodiments, to further improve the diagnostic and/or prognostic function of the energy usage baseline, the control system 22 may correlate energy usage data to generate the energy usage baselines. For example, the control system 22 may identify relationships between the various operational parameters, such as a product being produced, a time of day, operators on duty, environmental conditions, materials being used, product mix, operating conditions, production run rates, production schedules, product routing, control algorithms, and the like. In general, the energy usage under a particular set of operational parameters is expected to similar to energy usage in a previous instance under a similar set of operational parameters.

As such, separate energy usage baselines based on varying operational parameters may be used to enable the energy usage baselines to more accurately define the expected energy usage. For example, a first energy usage baseline may be set to describe the expected energy usage when a motor drive is actuating a load and a second energy usage baseline may be set to describe the expected energy usage when the motor drive is idle. Similarly, a first energy usage baseline may be set to describe expected energy usage when the motor drive is actuating a pump and a second energy usage baseline may be set to describe expected energy usage when the motor is actuating a fan. Furthermore, a first energy usage baseline may be set to describe expected energy usage when the motor drive operates during the day and a second energy usage baseline may be set to describe energy usage when the motor drive operates during the night.

In some embodiments, the control system 22 may additionally or alternatively utilize an energy consumption baseline. As described above, energy usage describes the amount of energy actually used by one or more components whereas energy consumption describes the total amount of energy consumed by the one or more components, which may include the energy usage as well as energy waste. Similar to the energy usage baseline, the energy consumption baseline may be set based on previous energy consumption.

In some embodiments, the use of the energy consumption baseline may provide further insight into diagnostics and/or prognostics. For example, even though energy usage by a component may fall within a range of the energy usage baseline, the energy consumption by the component may fall outside of the energy consumption baseline. In some embodiments, such a situation may facilitate identifying where a component is faulty or that a maintenance event is coming up. For example, when the acceptable range of the energy usage falls within the energy usage baseline, the component may be functioning properly, but when the energy consumption fall outside of the energy consumption baseline, the component may suffer from some problem, such as an environmental source of energy waste (e.g., excessive vibration or heat).

Although either or both the energy usage baseline and the energy consumption baseline may be used, to simplify discussion, the following will be directed to the energy usage baseline. However, one of ordinary skill in the art will understand that the energy consumption baseline may additionally or alternatively be used.

Once the energy usage baseline is set, the control system 22 may set alarms and/or events based on the energy usage baseline (process block 186). More specifically, as will be described in more detail below, the alarms and/or events may notify an operator when energy usage exceeds or nears the energy usage baseline. For example, if the energy usage of a motor drive exceeds its energy usage baseline, an alarm may indicate that the motor drive is potentially faulty. Additionally or alternatively, if the energy usage by a motor drive approaches the boundaries of its energy usage baselines, an event may be set to indicate that the motor drive may be operating less efficiently. As such, the control system 22 may recommend replacing the motor drive.

Additionally, the control system 22 may adjust the energy usage baseline over time (process block 188). More specifically, adjusting the energy usage baseline over time may enable gradual changes in the component 20 or components to be taken into account. For example, as a motor drive ages, the amount of energy usage by the motor drive may gradually increase. Accordingly, since the energy usage baseline may be determined by averaging previous energy usage, the energy usage baseline may also gradually increase.

In some embodiments, the number of previous energy usage values to use may be adjusted to help differentiate between energy usage changes that result from gradual aging of components and energy usage changes that result from a faulty component. For example, the amount of previous energy usage values may be increased to reduce the affect a sudden increase in energy usage will have on the baseline energy usage. On the other hand, the amount of previous energy usage values may be decreased to increase the adaptability of the baseline energy usage. As such, the energy usage baseline may automatically adjust over the course of operation.

Figures 14A, 14B:
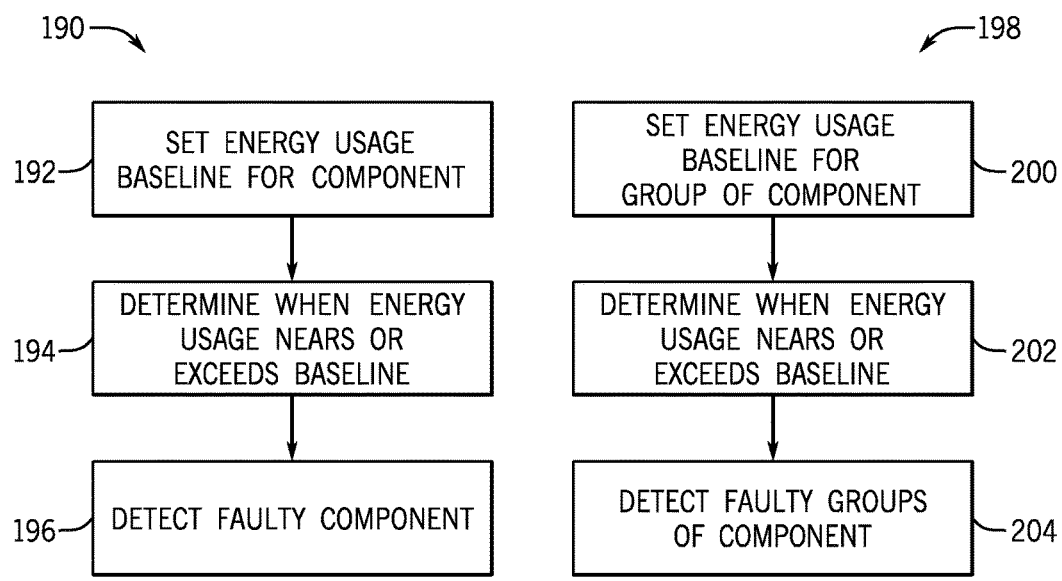
FIG. 14A illustrates a flow diagram of a method for detecting a fault in a component, in accordance with an embodiment presented herein.
FIG. 14B illustrates a flow diagram of a method for detecting a fault in a group of components, in accordance with an embodiment presented herein.

As described above, an energy usage baseline may be used to detect a fault in the component 20 or a group of components. One embodiment of a process 190 for detecting a fault in a component is described in FIG. 14A. Generally, the process 190 includes setting an energy usage baseline for a component (process block 192), determining when energy usage nears or exceeds the energy usage baseline (process block 194), and detecting a potentially faulty component (process block 196). The process 190 may be implemented via machine-readable instructions stored in the tangible non-transitory memory 36 and/or other memories and executed via processor 34 and/or other processors.

In some embodiments, the control system 22 may set the energy usage baseline for a single component (process block 192). As described above, the energy usage baseline may include a range of energy usage that is expected for the component (e.g., 400+/−55 kWh). More specifically, the control system 22 may determine expected energy usage based on the energy usage by the component over time. For example, the control system 22 may retrieve store energy usage values from memory 36 and determine an average of the values. Additionally, the processor 34 may determine the standard deviation of the energy usage values to identify a range of expected energy usage. As described above, the energy usage values used to set the energy usage baseline may be correlated based on various operational parameters, such as the product being produced, a time of day, operators on duty, environmental conditions, materials being used, and the like.

Once the energy usage baseline is set, the control system 22 may continue to monitor the energy usage by the component 20 to determine when the energy usage nears or exceeds the energy usage baseline (process block 194). More specifically, as the control system 22 continues to monitor energy usage, the control system 22 may store the energy usage values into memory 36. As such, the energy usage baseline may continue to adapt over time.

When the energy usage nears or exceeds the energy usage baseline, the control system 22 may determine that the component is potentially faulty (process block 196). As described above, the energy usage baseline describes the expected amount of energy usage. Accordingly, when energy usage nears or exceeds the energy usage baseline, it is an indication that the energy usage is not as expected. Since the energy usage is not as expected, is may be an indication that the component is not functioning as expected (e.g., potentially faulty). Additionally, the control system 22 may notify an operator of the potentially faulty component, for example, by producing an alarm to alert a user via the operator interface 24.

However, nearing or exceeding the energy usage baseline merely indicates that the component 20 is potentially faulty. In other words, the component 20 may, in fact, not actually be faulty. As such, the control system 22 may notify the operator of a probability that the component 20 is actually faulty (e.g., certainty that component is faulty). The degree of certainty that the component 20 is actually faulty may be based on various factors. For example, as described above, the energy usage of the component 20 may be inferred instead of directly measured. Accordingly, the certainty in the determined energy usage may also be accounted for in the probability that the component 20 is actually faulty.

Additionally, as described above, multiple energy usage baselines may be used. For example, a first energy usage baseline may describe the expected energy usage based on the all operations performed by the component 20 and a second energy usage baseline may describe the expected energy usage based on only a specific operation performed by the component 20. Accordingly, the probability that the component 20 is actually faulty may be based on whether the energy usage near or meets one or both of the energy usage baselines. For example, the probability that the component 20 is faulty may be less when the energy usage exceeds the second energy usage baseline but not the first energy usage baseline and may be higher when the energy usage exceeds both the first and the second energy usage baselines.

Furthermore, the probability that the component 20 is actually faulty may be based on where the determined energy usage falls within the energy usage baseline or how far the energy usage falls outside of the energy usage baseline. In other words, the probability of whether the component 20 is faulty may be based on how far the energy usage deviates from the expected energy usage.

As described above, energy usage baselines may be set for varying levels of granularity. For example, an energy usage baseline may be set for expected energy usage by a single component, parts of a single component, or a group of components (e.g., a cell 18, an area 16, or a stage in a process). As such, an energy usage baseline may also be used to detect whether a group of components is potentially faulty. One embodiment of a process 198 for determining whether a group of component is faulty is described in FIG. 14B. Generally, the process 198 includes setting an energy usage baseline for a group of components (process block 200), determine when energy usage near or exceed the energy usage baseline (process block 202), and detecting a faulty group of components (process block 204). The process 198 may be implemented via machine-readable instructions stored in the tangible non-transitory memory 36 and/or other memories and executed via processor 34 and/or other processors.

In some embodiments, the control system 22 may set the energy usage baseline for a group of components (process block 200). As with a single component, the energy usage baseline for a group of components may include a range of energy usage that is expected for the group of components (e.g., 400+/−55 kWh). More specifically, the control system 22 may determine expected energy usage based on the energy usage by the group of components over time. For example, the control system 22 may retrieve store energy usage values from memory 36 and determine an average of the values. Additionally, the control system 22 may determine the standard deviation of the energy usage values to identify a range of expected energy usage. As described above, the energy usage values used to set the energy usage baseline may be correlated based on various operational parameters, such as the product being produced, a time of day, operators on duty, environmental conditions, materials being used, and the like.

Once the energy usage baseline is set, the control system 22 may continue to monitor the energy usage by the group of components to determine when the energy usage nears or exceeds the energy usage baseline (process block 202). As the control system 22 continues to monitor energy usage, the control system 22 may store the energy usage values into memory 36. As such, the energy usage baseline may continue to adapt over time.

More specifically, in some embodiments, the control system 22 may monitor energy usage of each individual component in relation to its respective energy usage baseline. Additionally or alternatively, in other embodiments, the control system 22 may monitor the energy usage by the group of components as a whole because it is possible that even though each individual component is within its respective energy usage baseline the combination of the individual components may indicate an unexpected result. As such, the control system 22 may monitor the energy usage by the group of components, for example, by generating a mapping in n-space (e.g., a normative mapping surface) relating inputs to outputs based on empirical data. The control system 22 may then compare energy usage by the group of components to the normative mapping surface to determine the distance from the normative mapping surface. If the energy usage is further than a threshold from the normative mapping surface, the control system 22 may determine that the group of components is nearing or exceeding its energy usage baseline.

When the energy usage nears or exceeds the energy usage baseline, the control system 22 may determine that the group of components is potentially faulty (process block 204). As described above, the energy usage baseline describes the expected amount of energy usage. Accordingly, when energy usage nears or exceeds the energy usage baseline, it is an indication that the energy usage is not as expected. Since the energy usage is not as expected, it may be an indication that the group of components is not functioning as expected (e.g., potentially faulty). Additionally, the control system 22 may notify an operator of the potentially faulty group of component, for example, by generating an alarm that displays an alert on the operator interface 24.

In some embodiments, the control system 22 may identify a part of the component that may be faulty based on the energy usage. For example, if the energy usage baseline for a motor drive is 1+/−0.2 kWh, but during operation the energy usage is 1.4 kWh, the control system 22 may determine that since the energy usage is 70% more than expected a motor bearing in the motor drive is suspected to be faulty. In other words, amount of deviation from the energy usage baseline may be correlated with a specific fault that would cause the unexpected energy usage. In some embodiments, the correlation may be determined based on a previous operation and/or faults of the component or simulations of such.

Similar to a single component, nearing or exceeding the energy usage baseline merely indicates that the group of components is potentially faulty. In other words, the group of components may, in fact, not actually be faulty. As such, the control system 22 may notify the operator of the probability that the component is actually faulty (e.g., certainty that component is faulty). More specifically, the degree of certainty that the component is actually faulty may be based on various factors, such as the certainty in the determined energy usage, multiple energy usage baselines, and the amount of deviation from expected energy usage. For example, when energy usage is 5% outside of the energy usage baseline, the control system 22 may determine that there is a 60% chance that a motor drive is faulty and 20% change that the I/O chassis is faulty. Moreover, determining other operational parameters may facilitate identifying which component 20 is actually faulty. For example, determining that the current supplied to the motor drive is above twelve amps may indicate that the motor drive is actually faulty.

In addition to being used to detect when one or more components is potentially faulty, the energy usage baseline may be used to detect changes in the operation of one or more components in the industrial automation system 10. More specifically, as described above, the energy usage baseline may adjust as the control system 22 continues to monitor energy usage because the determined energy usage values may be used to set a subsequent energy usage baseline. As such, changes in the energy usage baseline may be used to detect changes in operation of a component or a group of components (e.g., area 16, cell 18, or stage in process).

Figure 15:
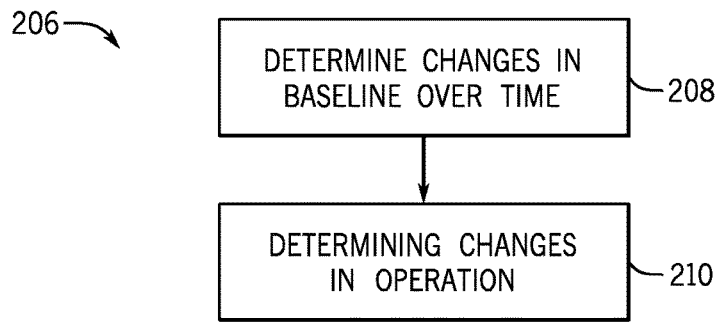
FIG. 15 illustrates a flow diagram of a method for determining changes in operation of a component or a group of components, in accordance with an embodiment presented herein.

One embodiment of a process 206 for detecting a change in operation of one or more components is described in FIG. 15. Generally, the process 206 includes determining changes in the energy usage baseline over time (process block 208) and determining changes in operation (process block 210). The process 206 may be implemented via machine-readable instructions stored in the tangible non-transitory memory 36 and/or other memories and executed via processor 34 and/or other processors.

In some embodiments, the control system 22 may keep track of the energy usage baseline to determine the changes in the energy usage baseline over time (process block 208). As described above, the energy usage baseline may be determined by averaging previous energy usage values over a certain period of time. Accordingly, as different (e.g., new) energy usage values are included to determine the energy usage baseline, the energy usage baseline may also change. To facilitate determining changes in the energy usage baseline, the processor 36 may store previous iterations of the energy usage baseline in memory 38 or other storage devices, such as the cloud.

Based on the changes to the energy usage baseline, the control system 22 may determine changes have occurred in operation of one or more components (process block 210). More generally, the control system 22 may use the previous iterations of the energy usage baseline to determine trends in energy usage over time. Changes in energy usage over time may indicate changes in operation of the one or more components. For example, energy usage by a motor drive has increased 3-5% each month for the previous three months but is still within its energy usage baseline. As such, the control system 22 may observe this trend and determine that energy usage will exceed the energy usage baseline in two months. As such, the control system 22 may recommend replacing the motor drive before the energy usage exceeds the energy usage baseline.

Additionally, changes in energy usage over time may indicate changes in operating conditions. For example, an increase in energy usage by a mixing component may indicate that the consistency of a raw material provided by a supplier has changed. Similarly, an increase in energy usage by a component may indicate a change in environmental conditions, such as excessive vibration from a surrounding component. In other words, determining changes in operation may enable diagnostics and prognostics, such as scheduling maintenance related events.

Figure 16:
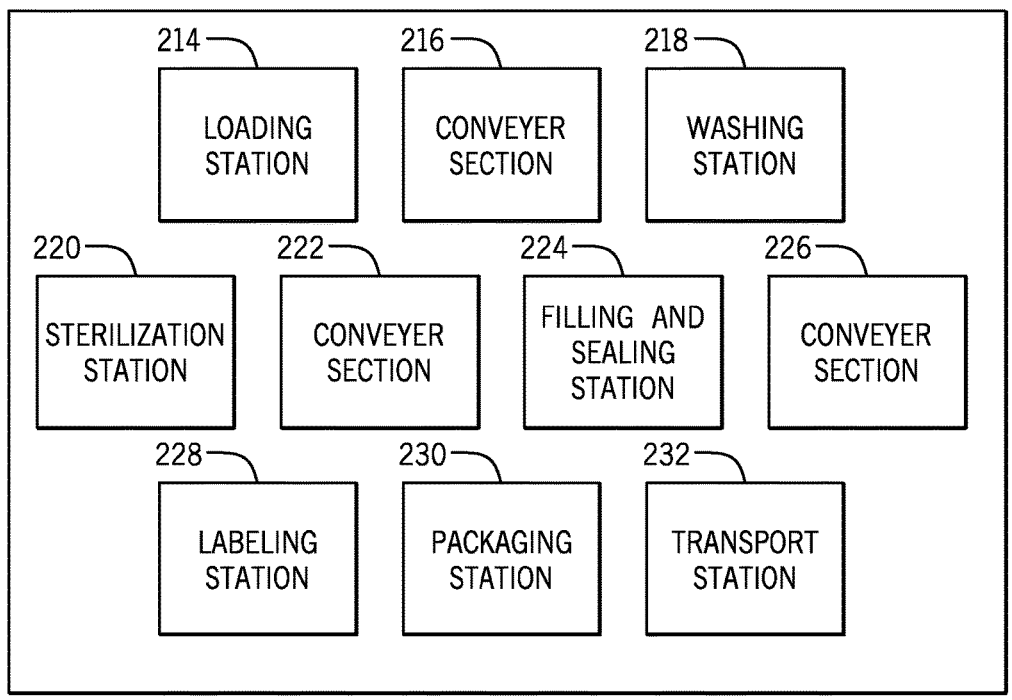
FIG. 16 illustrates a block diagram of an energy usage map for the industrial automation system of FIG. 4, in accordance with an embodiment presented herein.

To facilitate conveying such information to an operator, the control system 22 or a computing device communicatively coupled to the control system 22 may display a graphical user interface on the operator interface 24. One example of a graphical user interface 212 that may be displayed by the control system 22 is described in FIG. 16. The depicted graphical user interface 212 may be used for the packaging factory 50 described above. Accordingly, as depicted, the graphical user interface 212 includes a loading station graphical element 214, a conveyer section graphical element 216, a washing station graphical element 218, a sterilization station graphical element 220, a conveyer section graphical element 222, a filling and sealing station graphical element 224, a conveyer section graphical element 226, a labeling station graphical element 228, a packing station graphical element 230, and a transport station graphical element 232. The loading station graphical element 214 may convey information relating to the loading station 52, the conveyer section graphical element 216 may convey information relating to the conveyer section 54, the washing station graphical element 218 may convey information relation to the washing station 56, and so on.

In other words, each of the graphical elements (e.g., 216-232) may indicate the status of the components in the packing factory 50. In some embodiments, the graphical elements may illuminate different colors to indicate the energy usage of each component (e.g., a "heat" map). For example, a graphical element may illuminate green when the energy usage is within the energy usage baseline, illuminate yellow when the energy usage nears the energy usage baseline, and illuminate red when the energy usage exceeds the energy usage baseline. Additionally or alternatively, in other embodiments, the graphical elements may illuminate different colors to indicate when a maintenance related event is predicted. For example, a graphical element may illuminate green when maintenance is not predicted in the near future, illuminate yellow when maintenance is predicted in the near future, and illuminate red when maintenance should be performed as soon as possible. Accordingly, by looking at the color of the graphical elements, an operator may easily determine, for example, if a component is potentially faulty or when to perform maintenance on a component.

Additionally, in some embodiments, the information conveyed by the colors may be changed. For example, at a first time, the control system 22 may use colors to indicate energy usage and, at a second time, switch to using the colors to indicate whether a maintenance related activity is predicted. In fact, in some embodiments, text may replace or supplement the graphical elements. For example, when color is used to indicate energy usage, text may be displayed on each graphical element to indicate whether maintenance related activity is predicted.

Moreover, in the depicted embodiment, the control system 22 may display the graphical elements displayed generally in the same orientation as the corresponding physical components, which may enable an operator or the control system 22 to detect (e.g., correlate) conditions that affect more than one component, such as an area 16 or a cell 18. For example, if the conveyer section graphical element 216 and the washing station graphical element 218 both indicate energy usage outside of their respective energy usage baselines, an operator or the control system 22 may determine that something is affecting energy usage in cell 2, such as an environmental condition like excessive vibration. In other words, the operator or the control system 22 may determine additional information relating to the packing factory 50 based on the information indicate by each individual graphical element and the relation of the graphical elements to one another.

In other embodiments, information relating to energy usage may be communicated to an operator or the control system 22 through other graphical user interfaces configurations. More specifically, since energy usage information may determined at various levels of granularity, the information may also be communicated to an operator or the control system 22 with varying levels of granularity. For example, a cell 1 graphical element may convey information related to cell 1, a cell 2 graphical element may convey information related to cell 2, a cell 3 graphical element may convey information related to cell 3, and so on. Similarly, for production process 136, a loading stage graphical element may convey information related to the loading stage 138, a washing stage graphical element may convey information related to the washing stage 140, and a sealing stage graphical element may convey information related to the sealing stage 142. In such embodiments, the graphical elements may also communicate information by changing colors.

Based on the above described techniques, an energy usage baseline may be used to identify when one or more components 20 are potentially faulty and/or predict when a maintenance related activity should occur. As such, technical effects include enabling diagnostics and prognostics on components based on energy usage. More specifically, information relating to a component may be determined based on the energy usage in relation to an energy usage baseline (e.g., expected energy usage). For example, an operator may determine a component is potentially faulty if energy usage nears or exceeds the energy usage baseline. Additionally, such information may be easily communicated to an operator via a graphical user interface. For example, the graphical user interface may include graphical elements that use color to convey energy usage by a component.

Quantifying Energy Performance

As described above, expected energy usage may be determined based on previous operations and/or models. For example, the expected energy usage of a motor drive may be determined based on how much energy the motor drive was previously used in operation. Additionally, the expected energy usage of a motor drive may be determined based on a model of the motor drive, for example, generated based on a manufacturer's specifications. More specifically, the expected energy usage may be determined based on operations performed by a component or a group of components. For example, a first expected energy usage may be determined when the motor drive operates at a first speed and a second expected energy usage may be determined when the motor drive operates at a second speed.

Additionally, the operations performed by a component or group of components may affect aspects of the industrial automation system 10, such as operating costs or quality of products produced. For example, when the motor drive actuates a motor at a faster speed a product may be manufactured at a faster rate because the motor may cause a conveyer belt to turn faster. However, operating at a faster speed may use more energy and may affect the quality of the product.

Accordingly, it would be beneficial to include such factors when determining an operating strategy for one or more components in an industrial control system 10. More specifically, as will be described in more detail below, energy usage may be evaluated along with business and/or economic considerations to facilitate evaluating production decisions, supply chains decisions, make/buy decisions, and the like. In other words, various sets of operational parameters, such as production run rates, production schedule, product recipes, product routing, production methods, supply chain strategies, operating setpoints, and control algorithms, may be analyzed to help an operator or user make such decisions. As used herein, each set of operational parameters is described as an "operating strategy." In other words, design and/or operation of an industrial automation system 10 may be adjusted (e.g., by selecting a different operating strategy) based on costs (e.g., energy usage) and value added (e.g., product quality). As such, an operator may make an informed decision on how to optimize operation or improve the efficiency of one or more components in the industrial automation system 10.

In some embodiments, to facilitate determining executable actions (e.g., in an operating strategy), factors that may be used to make the decisions described above may be combined into an economic value-add index (EVI). For example, as will be described in more detail below, the economic value-add index may takes into account costs (e.g., energy usage) as well as value added (e.g., product throughput, product quality, and component up-time). Additionally, in some embodiments, executable actions may be used to dynamically adjustment the operating strategies in real-time based on real-time data, such as a sudden change in price per unit of energy usage or newly introduced/detected factors.

Figure 17:
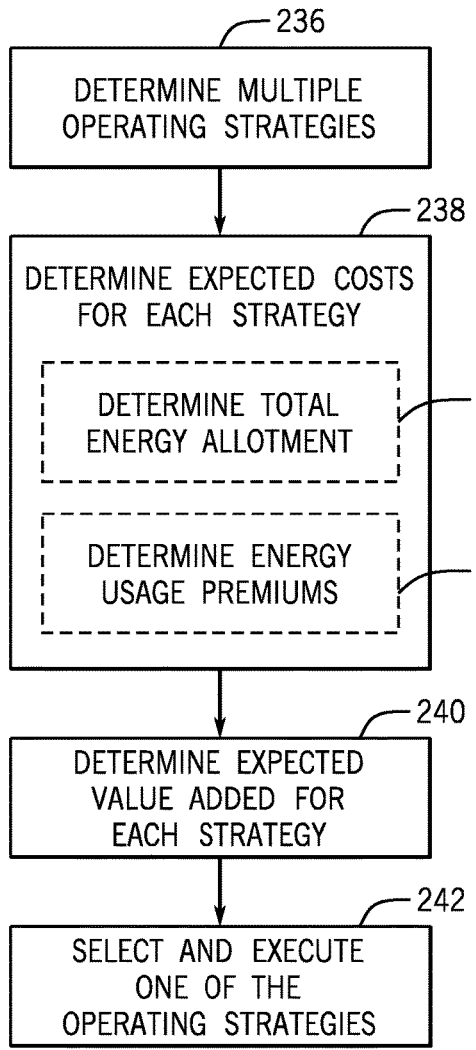
FIG. 17 illustrates a flow diagram of a method for selecting and executing an operating plan based at least in part on expected energy cost, in accordance with an embodiment presented herein.

One embodiment of a process 234 for determining an operating strategy for one or more components is described in FIG. 17. Generally, the process 234 includes determining multiple operating strategies (process block 236), determining expected cost for each strategy (process block 238), determining value added for each strategy (process block 240), and selecting and executing one of the operating strategies (process block 242). The process 234 may be implemented via machine-readable instructions stored in the tangible non-transitory memory 36 and/or other memories and executed via processor 34 and/or other processors. More specifically, process 234 may be implemented on various levels of granularity, for example at a component level, a cell level, an area level, a production process level, or a factory level.

In some embodiments, the control system 22 may determine multiple alternative operating strategies that may be implemented in one or more components (process block 236). As described above, various levels of granularity may be used. Accordingly, the control system 22 may determine operating strategies based on the level of granularity used. For example, when the granularity level is at a component level, the control system 22 may determine various operating strategies for a particular component. More specifically, the control system 22 may determine the various operating strategy in various manners. For example, an operator may compare multiple operating strategies by inputting them into the control system 22. Additionally or alternatively, the control system 22 may search for previously or a currently employed operating strategy by the one or more components.

As described above, each operating strategy may include operational parameters to be implemented in the industrial automation system 10, such as production run rates, production schedule, product recipes, product routing, operating setpoints, and control algorithms. For example, the operating strategy may include a speed at which to drive a motor. Thus, each operating strategy may include different costs as well as different values added. For example, actuating a motor with a motor drive at a first (e.g., faster) speed may use more energy but enable a higher production throughput. On the other hand actuating the motor at a second (e.g., slower) speed may use less energy but have a lower production throughput.

Accordingly, to facilitate selecting an operating strategy to implement, the control system 22 may quantify the expected cost for each operating strategy (process block 238). As described above, one cost that may be included for each operating strategy is energy usage. To facilitate determining the cost associated with energy usage, the control system 22 may determine the amount of energy usage expected for each operating strategy, for example, using the techniques described above. For instance, the control system 22 may predict the energy usage of a motor for when operating at various speeds using a model of the motor generated based on a manufacturer's specifications. Additionally, the control system 22 may determine the price per unit (e.g., kilowatt-hour) of energy usage that a utility provider charges. Thus, the control system 22 may determine cost of the energy usage based on the expected energy usage and the price per unit of the energy usage.

In some embodiments, the price per unit of energy usage is not constant. For example, the price may fluctuate based on time of day or day of the week. Accordingly, the control system 22 may determine factors that may affect the price per unit of energy usage. For example, the control system 22 may determine the total energy usage allotment for the one or more components (process block 244). In some embodiments, a utility provider will allot the industrial automation system 10 a specific amount of energy usage. For example, the utility provider may provide the industrial automation system 10 with 500 kWh of energy usage in a day. If the energy usage exceeds the allotment, the utility provider may charge a premium (e.g., increase the price per unit of energy usage), cutoff energy, or supply energy at a reduced rate. Additionally, in some embodiments, the control system 22 may allot one or more components a specific amount of energy usage. As such, the control system 22 may determine whether the expected energy usage for each operating strategy within its allotment and the cost of going over the allotment.

Additionally, for example, the control system 22 may determine whether the utility provider is expected to charge an energy usage premium (process block 246). In some cases, a utility provider will charge an increase in price per unit of energy usage to offset its costs. For example, when a utility provider's main generator goes offline, the utility provider may have to switch to a backup generator, which may only be used a few times a year, to continue providing power to the industrial automation system 10. However, to offset the maintenance costs of the backup generator, the utility provider may pass the cost by increasing price per unit of energy usage while the backup generator is in use. Accordingly, the control system 22 may determine the amount of the increased premiums, the expected period of the increased premiums, and the amount of energy usage expected during the period of increased premiums. In some embodiments, energy usage premiums may be unpredictable. As such, the control system 22 may determine the cost associated with the energy usage premiums in real-time (e.g., as soon as the energy usage premium detected).

In addition to the cost associated with energy usage, the control system 22 may also determine other costs associated with each operating strategy. In some embodiments, the costs associated with an operating strategy may include opportunity costs, cost of materials, life cycle costs, maintenance costs, quality costs, and the like. For example, operating an oven at 100% rated maximum temperature may shorten the life span of the oven. Accordingly, the control system 22 may determine the cost associated with the change in the life cycle of the motor drive and/or motor. Additionally, operating a component at a particular operational parameter may affect the surrounding components. For example, actuating a motor at a higher speed may cause additional vibration that affects the operation of surround components. Accordingly, in order to operate a component at a particular operational parameter, parts of the industrial automation system 10 may be adjusted. For example, to reduce the effect of the additional vibration, dampers may be put in place, which increases cost.

The control system 22 may also determine the expected value added for each operating strategy (process block 240). More specifically, the value added may include factors that offset costs, such as improved throughput, increased up-time, or increased product quality. In other words, the control system 22 may quantify benefits associated with each operating strategy. For example, when a motor is actuated at a first (e.g., faster) speed, the throughput may be increased as compared to when the motor is actuated at a second (e.g., slower) speed. Accordingly, the control system 22 may quantify the value added as a result of the difference in throughput. Similarly, the control system 22 may quantify a difference in product quality and up-time of components.

Based on the expected cost and the value added, the control system 22 may select and execute one of the operating strategies (process block 242). In some embodiments, the control system 22 may select an operating strategy using various optimization techniques. For example, the control system 22 may select the operating strategy that minimizes an objective function of an optimization problem subject to the hard and soft constraints (e.g., energy usage allotment or maximum speed/temperature). In other words, the objective function may be formulated to set criteria for selecting an operating strategy. For example, in some embodiments, the objective function may be formulated such that the operating strategy with the largest difference between the value added and the costs is selected. In other words, the operating strategy may have a predicted superior economic value. It should be noted that in some situations the operating strategy selected does not necessarily have the least amount of energy usage since the energy usage costs may be offset by an even larger value added.

In other embodiments, the objective function may be formulated to weigh certain criteria (e.g., targets) for each operating strategy. For example, the objective function may be formulated to minimize energy usage while maintaining a particular amount of throughput and maintaining a particular product quality. In other words, the objective function may enable the costs to be minimized while ensuring a certain amount of product quality. As will be described in more detail below, to facilitate selecting an operating strategy, the cost and value added for each operating strategy may be quantified into an economic value-add index (EVI).

As can be appreciated, there may be some amount of uncertainty when determining the expected cost and value added for each strategy. For example, the uncertainty may result from uncertainty in models used to infer energy usage, the predictability of energy usage, unpredicted or unexpected operating conditions (e.g., brittle product that is subject to disturbance), and the like. More specifically, a slight disturbance to an operating strategy may cause undesired results, such as scrapping an entire batch, which increases cost.

Accordingly, the control system 22 may determine the sensitivity or certainty of each operating strategy. More specifically, the control system 22 may determine the sensitivity or certainty in various manners, such as based on empirical studies of the materials used, tolerances of variations in components, and/or uncertainties in models. The control system 22 may then include the sensitivity or certainty in selecting the operating strategy. For example, a first operating strategy may have a cost to added value difference of 100 units but have a 10% certainty and a second strategy may have a cost to value added difference of 80 units but have an 80% certainty (e.g., more reliable and robust). In such a situation, the control system 22 may select the second operating strategy because the effective cost to value added difference of the second operating strategy is 64 units (e.g., 80*0.8) as compared to 10 units (e.g., 100*0.1) of the first operating strategy.

The control system 22 may execute the selected strategy by implementing the operating strategy. In some embodiments, the control system 22 may enable automatically implementing operational parameters included in the selected operating system by transmitting instructions to one or more components. For example, the control system 22 may transmit desired operating speed of a motor to a motor drive via the communication network 29 and, in response, the motor drive may attempt to operate the motor at the desired speed. In other embodiments, the control strategy may notify a user of operational parameters that should be adjusted to implement the operating strategy. More specifically, this may include operational parameters that are not directly related to operation of the components. For example, the control system 22 may inform a user of a desired product mix or raw material quality that should be used via the operator interface 24.

Figure 18:
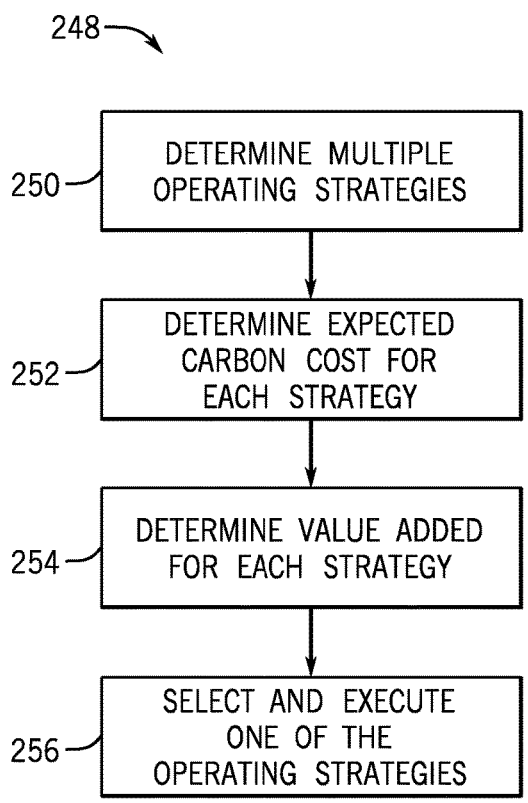
FIG. 18 illustrates a flow diagram of a method for selecting and executing an operating plan based at least in part on expected carbon cost, in accordance with an embodiment presented herein.

In addition to implementing an operating strategy based on economic analysis, an operating strategy may be selected and implemented based on other criteria, such as a carbon footprint. To help illustrate, one embodiment of a process 248 for determining an operating strategy for one or more components based on carbon footprint is described in FIG. 18. Generally, the process 248 includes determining multiple operating strategies (process block 250), determining expected carbon costs for each operating strategy (process block 252), determining value added for each operating strategy (process block 254), and selecting and implementing one of the operating strategies (process block 256). The process 234 may be implemented via machine-readable instructions stored in the tangible non-transitory memory 36 and/or other memories and executed via processor 34 and/or other processors. More specifically, similar to process 234, process 248 may be implemented on various levels of granularity, for example at a component level, a cell level, an area level, a production process level, or a factory level.

Accordingly, similar to process block 236, the control system 22 may determine multiple alternative operating strategies that may be implemented in one or more components (process block 250). More specifically, the control system 22 may determine operating strategies based on the level of granularity used, for example at a component level. The control system 22 may determine the various operating strategy in various manners, for example, via manual entry or based on previously and/or a currently employed operating strategies.

Additionally, each operating strategy may include operational parameters to be implemented in the industrial automation system 10, such as production run rates, production schedule, product recipes, product routing, and energy sourcing. As discussed above, implementing an operating strategy may use energy, which may be generated via a process (e.g., burning coal) that produces carbon. In some countries, the carbon footprint is an important consideration, for example, because of the number of carbon credits allotted or fees that must be paid based on carbon footprint.

Accordingly, to facilitate selecting an operating strategy to implement, the control system 22 may quantify the expected carbon cost for each operating strategy (process block 252). In some embodiments, the carbon cost may be based on the amount of energy used and how the energy was generated. For example, producing 100 kWh of energy by burning coal may produce two metric tons of carbon whereas producing 100 kWh of energy using wind power may produce half a metric ton of carbon. However, the price per unit of energy usage charged for using the 100 kWh generated by burning coal may be more cost effective than the 100 kWh generated using wind power. As such, the control system 22 may determine the expected carbon cost by multiplying the expected energy usage with the carbon produced to generate the energy usage.

Additionally, similar to process block 240, the control system 22 may also determine the expected value added for each operating strategy (process block 254). More specifically, the value added may include factors that offset the carbon costs, such as improved stability of the energy supply or subsidies provided by a governing body for using energy generated a particular way (e.g., renewable resources). In other words, the control system 22 may quantify benefits associated with each operating strategy. For example, a governing body may give additional carbon credits when using energy generated using renewable resources. Accordingly, the control system 22 may quantify the value added as a result of the additional carbon credits, such as enabling use of the credits in other parts of the industrial control system or to sell to others.

Based on the expected carbon cost and the value added, the control system 22 may select and execute one of the operating strategies (process block 256). More specifically, the operating strategy may be selected based on various criteria. For example, in some embodiments, an industrial control system 10 may be allotted a certain amount of carbon credit. As such, the control system 22 may select operating strategies that fit within the carbon credit allotment. More specifically, the control system 22 may determine the number of carbon credits that will be used in each operating strategy by offsetting the expected carbon costs with the value-added.

Additionally, in some embodiments, the control system 22 may select an operating strategy that maximizes usage of allotted carbon credits using various optimization techniques. For example, the control system 22 may select the operating strategy that minimizes the total carbon footprint. Additionally, the control system 22 may select the operating strategy that uses most or all of the allotted carbon credits.

Similar to the economic analysis described above, selecting an operating strategy may additionally include other factors, such as throughput, product quality, up-time, uncertainty/sensitivity, and the like. For example, the control system 22 may select the operating strategy that minimizes carbon footprint while maintaining a minimum level of product throughput and a minimum level of product quality. Similar to process block 242, the control system 22 may then execute the selected strategy by implementing the operating strategy in one or more components.

In some instances, carbon credits may have economic value. More specifically, unused carbon credits may be sold to others and extra carbon credits may be purchased from others. As such, the carbon footprint analysis may also be included in the economic analysis described above. In other words, the use of carbon credits above the given allotment may be economically quantified based on the cost of purchasing more credits from another entity, for example, from a governing body or another factory. Similarly, unused (e.g., excess) carbon credits may be economically quantified based on the value of selling the carbon credits to another entity, for example, a governing body or another factory. In other words, one of ordinary skill in art will understand that each of the factors (e.g., energy usage, carbon credits, throughput, product quality, and up-time) may be combined in various analysis (e.g., economic or carbon footprint). Additionally, as described above, each of the factors may be weighted, for example through formulation of an objective function, to select an operating strategy with desired characteristics (e.g., a minimum throughput, a minimum product quality, a maximum energy usage, a maximum carbon footprint, a maximum uncertainty, or a minimum up-time or reliability).

Figure 19:
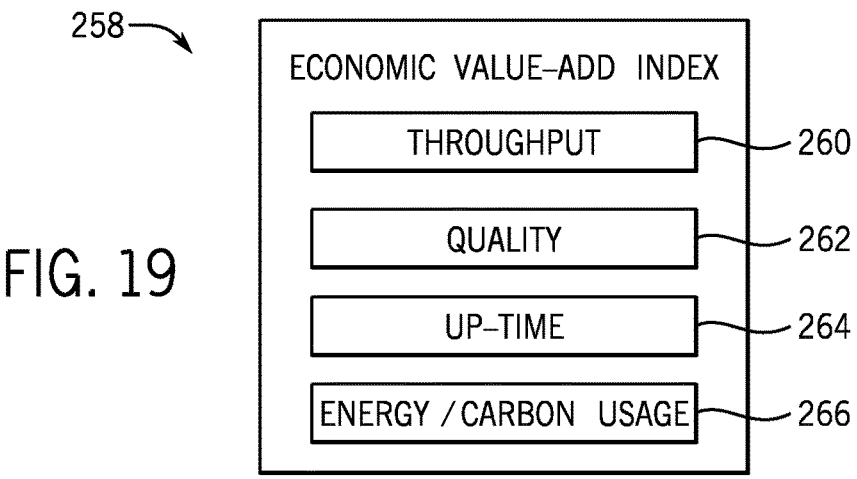
FIG. 19 illustrates a block diagram of an economic value-add index (EVI), in accordance with an embodiment presented herein.

Accordingly, to facilitate taking into account each of the various factors, the factors may combined into an economic value-add index (EVI). More specifically, the economic value-add index may quantify the economic value added by one unit of operation by a component or a group of components. One embodiment of an economic value-add index 258 is depicted in FIG. 19. As depicted, the economic value-add index 258 quantifies product throughput 260, product quality 262, component up-time 264, and energy/carbon usage 262. Generally, the product throughput 260 describes the amount of product that is output, the product quality 262 describes the quality of the output product, and the component up-time describes the reliability of the components. In some embodiments, the factors may be quantified and combined into a single metric. For example, each of the factors may be defined economic terms.

Figure 20:
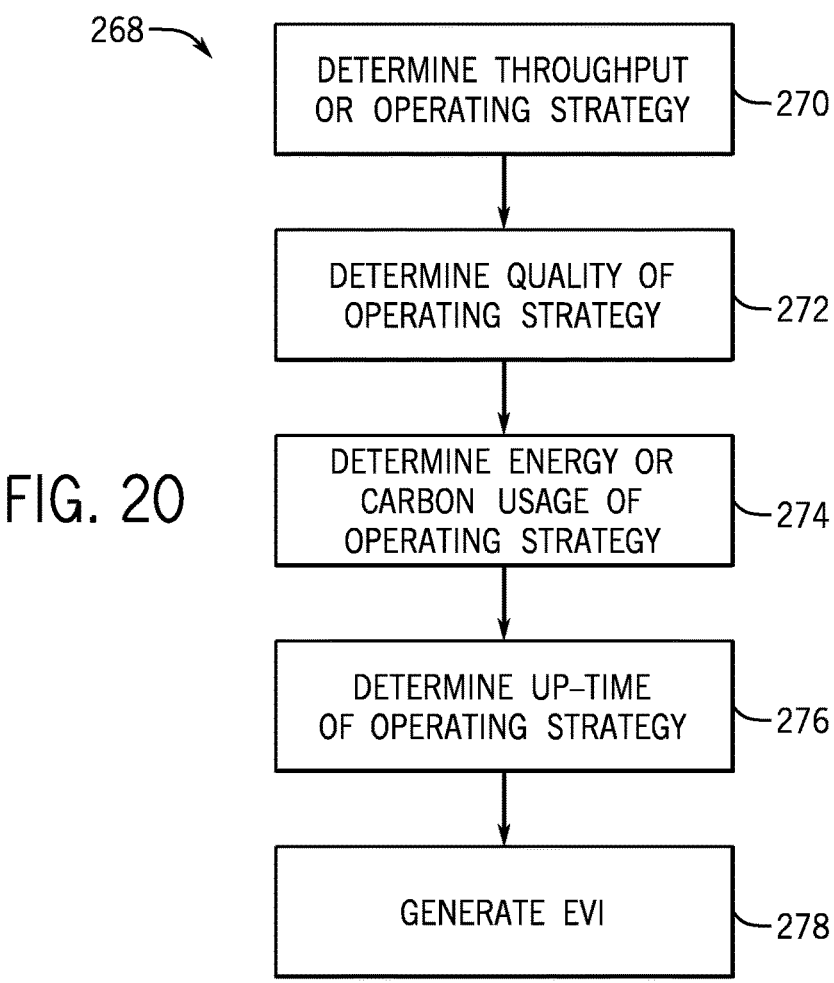
FIG. 20 illustrates a flow diagram of a method for generating an economic value-add index (EVI), in accordance with an embodiment presented herein.

To help illustrate, one embodiment of a process 268 for generating the economic value-add index for an operating strategy is described in FIG. 20. Generally, the process 268 includes determining product throughput of the operating strategy (process block 270), determining product quality of the operating strategy (process block 272), determining energy usage or carbon footprint of the operating strategy (process block 274), determining component up-time (e.g., reliability) of the operating strategy (process block 276), and generating the economic value-add index (process block 278). The process 268 may be implemented via machine-readable instructions stored in the tangible non-transitory memory 36 and/or other memories and executed via processor 34 and/or other processors.

In some embodiments, the control system 22 may determine the product throughout expected if the operating strategy is implemented (process block 270). More specifically, the product throughput may include the number or amount of a product that a component or a group of components is expected to output. For example, when a motor actuates a conveyer belt, the product throughput may include the number of bottles that are transported on the conveyer belt per minute. Similarly, the product throughput of a washing stage 140 may include the number of bottles that are washed by the components in the washing stage 140 per day.

To facilitate determining the expected product throughput, the control system 22 may utilize models to simulate operation of the one or more components that will implement the operating strategy or empirical testing. In some embodiments, the model may be based on empirical testing and/or manufacturer specifications. For example, as described above, the operating strategy may include a specific operating speed for the motor. As such, the control system 22 may use a model of the motor to simulate operation of the motor at the operating speed and determine the number of bottles that will be transported per minute. Similarly, the operating strategy may include operational parameters for the components in the washing stage 140. As such, the control system 22 may use a model of the washing stage 140 to simulate operation of the components in the washing stage 140 if the operational parameters are implemented and determine the number of bottles that will be washed per day.

Additionally, the control system 22 may determine the product quality of the operating strategy (process block 272). More specifically, the product quality may be based on objective or subjective criteria. In some embodiments, the criteria used is based on the type of product that is being produced. For example, if the product being produced is washed bottles, the criteria used to determine product quality may include cleanliness of the bottles. Additionally, in some embodiments, the product quality may include the effect on overall quality of an intermediate or a final product. For example, the criteria used to determine product quality for a motor drive may include the effect on consistency of the bottled beverage produced when operating at the specific speed.

In some embodiments, the product quality may be determined based on empirical testing. For example, an operator may implement the operating strategy and determine product quality by examining the produced product. For example, the operator may examine every fifth washed bottle to determine cleanliness of the bottles washed by the washing stage 140. Similarly, the operator may examine every tenth bottle beverage to determine the effect on consistency resulting from operating the motor drive at different speeds.

Furthermore, the control system 22 may determine the energy usage or carbon footprint of the operating strategy, for example, using the techniques described above (process block 274). More specifically, the energy usage by a component may be inferred based on how much energy the motor drive previously used in operation. Additionally, the expected energy usage of a motor drive may be determined based on a model of the motor drive, for example, generated based on a manufacturer's specifications or principles of physics. As described above, the carbon footprint may also be determined in using similar techniques.

The control system 22 may also determine the up-time (e.g., reliability) of the one or more components that will implement the operating strategy (process block 276). More specifically, the up-time of a component may be based upon the time that is expected between maintenance related activities, such as servicing or replacing a component. As described above, operating a component with different operational parameters may affect the life span of the component.

In some embodiments, the up-time of one or more components may be based on energy usage. More specifically, as described above, energy usage that exceeds an energy usage baseline may indicate the possibility of a maintenance related activity. For example, an operator may run a motor using the motor drive at an operating speed specified in the operating strategy and measure the time until the motor nears or exceeds a baseline to determine the up-time of the motor if the operating strategy is implemented. Moreover, as described above, maintenance related events may also be predicted based on trends in the energy usage. For example, an operator may observe an increasing trend in energy usage by the motor drive and determine that the energy usage will near or exceed the energy usage baseline within two months. As such, the up-time of one or more components (e.g., motor and/or motor drive) may be predicted based on trends in energy usage.

Based on each of the factors, the control system 22 may combine the factors into the economic value-add index (process block 278). As described above, the economic value-add index may combine the factors into actionable data. In some embodiments, the economic value-add index may be a single metric that can be assigned to an operating strategy. As such, an economic value-add index may enable an operator to differentiate between various operating strategies.

More specifically, the economic value-add index may be generated by quantifying each of the factors into the same metric. For example, the product throughput, the product quality, the energy usage/carbon footprint, and the component up-time may be quantified in economic terms and added together. In some embodiments, economically quantifying each of the factors may include determining the cost and value added in dollars. More specifically, the value added may be positive values and the cost may be negative values. As such, an operating strategy with a higher economic value-add index may indicate that it would be advantageous to implement that operating strategy because implementing the operating strategy would provide greater economic benefit.

In other embodiments, the economic value-add index may simply be a value within a range. For example, the economic value-add index may be a value between zero and ten with ten being the highest economic benefit and zero being the lowest. As such, the control system 22 may determine the economic value-add index by quantifying each of the factors according to the range. Additionally, in some embodiments, each of the factors may be weighted when generating the economic value-add index. For example, the product throughput may be quantified as a value between zero to one, the product quality may be a value between zero to two, the component up-time may be a value between zero to two, and the energy usage may be a value between zero to five. In such an embodiment, the energy usage may be weighted more heavily than the other factors. In other embodiments, the factors may be weighted differently, for example, to emphasize product quality. As such, the economic value-add index may facilitate determining which operating strategy most fits a particular set of selection criteria, for example, greatest economic benefit (e.g., difference between value added and cost) or lowest energy usage. As described above, the control system 22 may then utilize the economic value-add index to select an operating strategy to be implemented.

Based on the techniques described above, various operating strategies may be compared and/or qualified. Accordingly, technical effects of the present disclosure include providing techniques to select and implement an operating strategy from a plurality of operating strategies in an industrial automation system. Generally, each operating strategy may affect operational parameters such as energy usage, product throughput, product quality, or component up-time. Accordingly, to facilitate differentiating between various operating strategies, each of the factors may be quantified. For example, in some embodiments, the factors may be quantified as an economic value-add index (EVI), which is assigned to each operating strategy. More specifically, the economic value-add index may indicate the economic benefit of an operating strategy or how closely the operating strategy fits a particular set of criteria. As such, based on the economic value-add index, an operating strategy that includes desirable operational parameters will be selected and implemented in the industrial automation system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation system, comprising:
a first industrial automation component;
a first sensor coupled to the first industrial automation component, wherein the first sensor is configured to measure a first amount of power supplied to the first industrial automation component;
a second industrial automation component electrically coupled to the first industrial automation component; and
an industrial control system communicatively coupled to the first sensor, the first industrial automation component, and the second industrial automation component, wherein the industrial control system is configured to:
infer energy usage by the first industrial automation component and the second industrial automation component based at least in part on the first amount of power supplied to the first industrial automation component measured by the first sensor; and
control operation of the first industrial automation component, the second industrial automation component, or both based at least in part on the energy usage inferred from first amount of power supplied to the first industrial automation component to facilitate improving energy usage efficiency of the industrial automation system.

2. The industrial automation system of claim 1, wherein the industrial control system is configured to infer a portion the energy usage attributed to the first industrial automation component based at least in part on a model of the first industrial automation component.

3. The industrial automation system of claim 2, wherein the model is calibrated based at least in part on one or more manufacturer specifications associated with the first industrial automation component, previous operation of the first industrial automation component, or any combination thereof.

4. The industrial automation system of claim 2, wherein the industrial control system is configured to verify the model of the first industrial automation component by:
determining actual energy usage associated with the first industrial automation component; and
adjusting the model such that the portion of the energy usage determined with model more closely approximates the actual energy usage.

5. The industrial automation system of claim 4, wherein the actual energy usage associated with the first industrial automation component is determined based on a measurement of energy usage acquired by a second sensor electrically coupled between the first industrial component and the second industrial automation component.

6. The industrial automation system of claim 1, wherein the industrial control system is configured to infer a portion the energy usage attributed to the second industrial automation component by:
determining a second amount of power used by the first industrial automation component; and
subtracting the second amount of power used by the first industrial automation component from the first amount of power measured by the first sensor.

7. The industrial automation system of claim 1, wherein the first industrial automation component is configured to provide a second amount of power to the second industrial automation component.

8. The industrial automation system of claim 1, wherein the first industrial automation component comprises a drive and the second industrial automation component comprises a motor.

9. The industrial automation system of claim 1, wherein the industrial automation system is a material handling system, a packaging system, a manufacturing system, processing system, a batch processing system, or any combination thereof.

10. The industrial automation system of claim 1, comprising a plurality of cells, wherein each cell of the plurality of cells is configured to perform at least one operation in the industrial automation system, and wherein the first industrial automation component and the second industrial automation component are part of a first cell of the plurality of cells.

11. A method comprising:
receiving, via at least one processor, an indication of a first amount of power provided to a first industrial automation component from a first sensor;
inferring, via the at least one processor, first energy usage associated with the first industrial automation component based at least in part on a model of the first industrial automation component and the first amount of power;
inferring, via the at least one processor, second energy usage associated with a second industrial automation component based at least in part on the first amount of power provided to the first industrial automation component and the first energy usage associated with the first industrial automation component, wherein the first industrial automation component is configured to provide a second amount of power to the second industrial automation component; and
controlling, via the at least one processor, operation of the first industrial automation component, the second industrial automation component, or both based at least in part on the first energy usage associated with the first industrial automation component and the second energy usage associated with the second industrial automation component to facilitate improving energy usage efficiency.

12. The method of claim 11, wherein the second amount of power provided to the second industrial automation component is not directly measured by a second sensor associated with the second industrial automation component.

13. The method of claim 12, wherein the second amount of power comprises a voltage and a current provided to the second industrial automation component.

14. The method of claim 11, comprising:
measuring actual energy usage associated with the first industrial automation component via a second sensor; and
adjusting the model based on the actual energy usage.

15. The method of claim 11, comprising:
determining a third amount of power used by the first industrial automation component; and
determining the first energy usage associated with the first industrial automation component, the second energy usage associated with the second industrial automation component, or both based at least in part on a difference between the third amount of power used by the first industrial automation component and the first amount of power provided to the first industrial automation component.

16. The method of claim 11, wherein the first industrial automation component is a motor drive and the second industrial automation component comprises a controller, an input/output (I/O) module, a motor control center, a motor, a human machine interface (HMI), an operator interface, a contactor, a starter, a drive, a relay, a protection device, switchgear, a compressor, a scanner, a gauge, a valve, a flow meter, or any combination thereof.

17. An industrial automation system comprising:
a first group of industrial automation components;
a sensor coupled to the first group of industrial automation components, wherein the sensor is configured to measure an operational parameter of the first group of industrial automation components;
a second group of industrial automation components related to the first group of industrial automation components; and
an industrial control system communicatively coupled to the sensor, the first group of industrial automation components, and the second group of industrial automation components, wherein the industrial control system is configured to:
determine energy usage by the first group of industrial automation components and the second group of industrial automation components based at least in part on the operational parameter of the first group of industrial automation components measured by the sensor; and
control operation of any combination of the first group of industrial automation components and the second group of industrial automation components based at least in part on the energy usage by the first group of industrial automation components and the second group of industrial automation components to facilitate improving energy usage efficiency of the industrial automation system.

18. The industrial automation system of claim 17, wherein:
the sensor is configured to measure energy supplied to the first group of industrial automation components and the second group of industrial automation components; and
the industrial control system is configured to determine a portion of the energy usage attributed to the second group of industrial automation components based at least in part on the energy measured via the sensor.

19. The industrial automation system of claim 17, comprising a plurality of cells, wherein:
each cell of the plurality of cells is configured to perform at least one operation in the industrial automation system;
the first group of industrial automation components is a first cell of the plurality of cells; and
the second group of industrial automation components is a second cell of the plurality of cells.

20. The industrial automation system of claim 17, wherein:
the first group of industrial automation components is associated with a first stage in a production process; and
the second group of industrial automation components is associated with a second stage in the production process.

* * * * *